United States Patent
Yamanouchi

(10) Patent No.: US 9,312,894 B2
(45) Date of Patent: Apr. 12, 2016

(54) RADIO TRANSMITTING DEVICE AND RADIO TRANSMITTING METHOD

(71) Applicant: NEC CORPORATION, Tokyo (JP)

(72) Inventor: Shingo Yamanouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/772,425

(22) PCT Filed: Mar. 4, 2014

(86) PCT No.: PCT/JP2014/001177
§ 371 (c)(1),
(2) Date: Sep. 3, 2015

(87) PCT Pub. No.: WO2014/136437
PCT Pub. Date: Sep. 12, 2014

(65) Prior Publication Data
US 2016/0013820 A1    Jan. 14, 2016

(30) Foreign Application Priority Data
Mar. 7, 2013  (JP) ................................. 2013-045559

(51) Int. Cl.
*H04L 25/49* (2006.01)
*H04B 1/04* (2006.01)
*H04L 25/08* (2006.01)

(52) U.S. Cl.
CPC .............. *H04B 1/0475* (2013.01); *H04L 25/08* (2013.01)

(58) Field of Classification Search
CPC ...................... H04B 1/0475; H04B 2001/0425; H04L 25/08; H04L 27/367; H04L 27/368; H04L 27/366; H03F 1/3247; H03F 1/32; H03F 1/3241; H03F 2201/3224; H03F 2201/3233

USPC ................. 375/267, 296–297, 299; 455/63.1, 455/67.13, 101, 114.1, 114.3
See application file for complete search history.

(56) References Cited

U.S. PATENT DOCUMENTS

| | | | |
|---|---|---|---|
| 7,242,707 B1 * | 7/2007 | Miao | H04B 1/71635 375/130 |
| 8,929,480 B2 * | 1/2015 | Fukuda | G06G 7/14 341/143 |
| 2010/0316157 A1 | 12/2010 | Bassam et al. | |

(Continued)

FOREIGN PATENT DOCUMENTS

| JP | 2001-251148 A | 9/2001 |
|---|---|---|
| JP | 2010-519862 A | 6/2010 |
| JP | 2012-216969 A | 11/2012 |

OTHER PUBLICATIONS

International Search Report of PCT/JP2014/001177, dated Jun. 3, 2014. [PCT/ISA/210].

Primary Examiner — Khanh C Tran
(74) Attorney, Agent, or Firm — Sughrue Mion, PLLC

(57) ABSTRACT

The amount of distortion of the output signal increases due to a difference in delay times in a plurality of paths in a radio transmitting device transmitting RF signals in a plurality of bands, therefore, a radio transmitting device according to an exemplary aspect of the present invention includes: a multi-band RF signal generator making each of a plurality of input baseband signals carried by a carrier wave with each of different frequencies, and outputting the carrier wave as a radio frequency signal; a power amplifier amplifying and outputting the radio frequency signal; a distortion compensation control signal generating unit applying a distortion compensating function, which compensates a distortion characteristic of the power amplifier, to the each of the plurality of input baseband signals; and a transmitter delay correction unit correcting a difference in delays which the plurality of input baseband signals receive respectively in the multi-band RF signal generator.

19 Claims, 16 Drawing Sheets

(56) References Cited

U.S. PATENT DOCUMENTS

| | | | |
|---|---|---|---|
| 2013/0064325 A1* | 3/2013 | Kilambi | H03F 1/3247 375/297 |
| 2014/0348263 A1* | 11/2014 | Rollins | H04L 27/368 375/297 |
| 2015/0236731 A1* | 8/2015 | Ghannouchi | H04B 1/0475 375/296 |

* cited by examiner

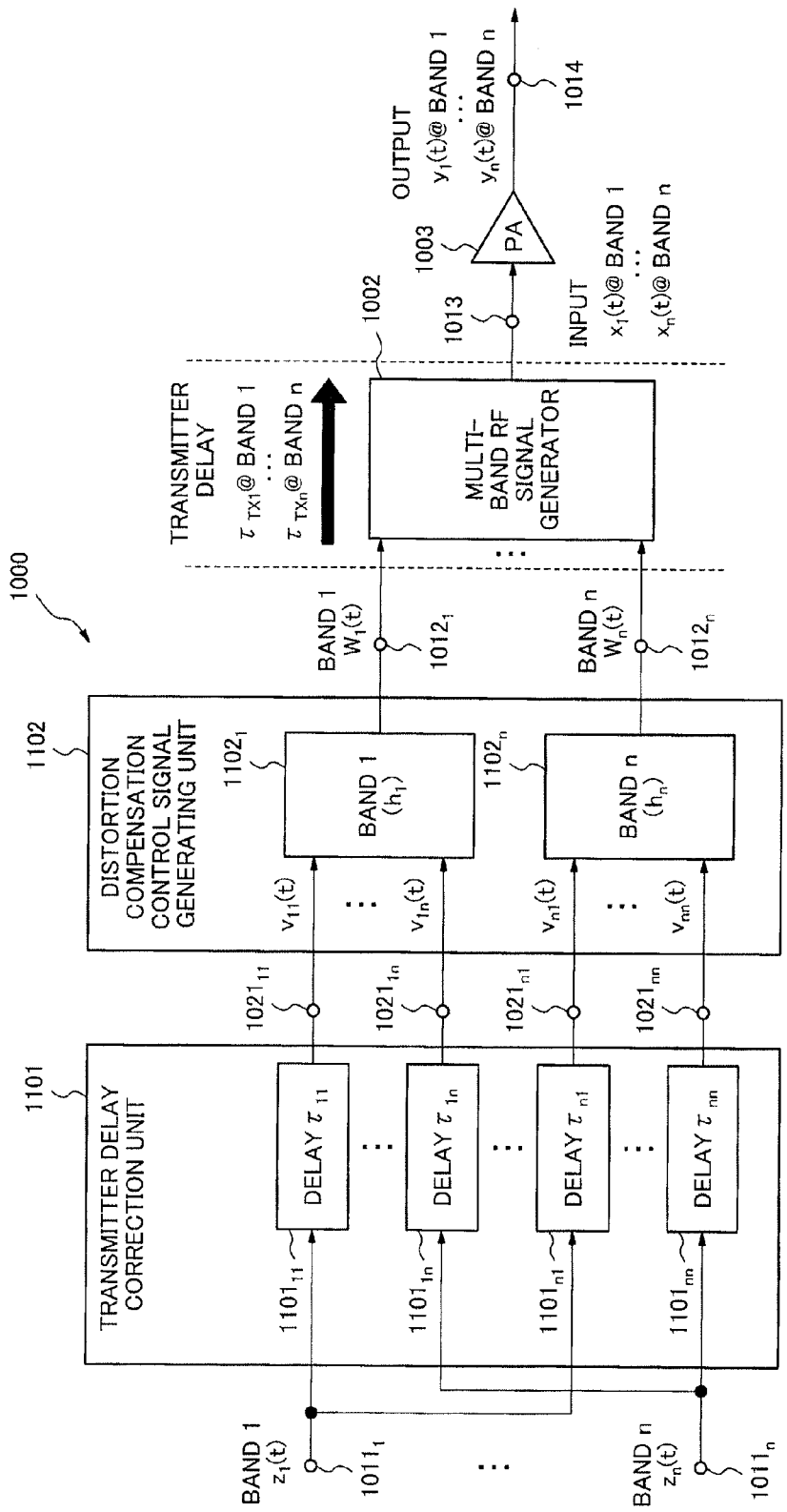

RADIO TRANSMITTING DEVICE AND RADIO TRANSMITTING METHOD

CROSS REFERENCE TO RELATED APPLICATIONS

This application is a National Stage of International Application No. PCT/JP2014/001177 filed Mar. 4, 2014, claiming priority based on Japanese Patent Application No. 2013-045559, filed Mar. 7, 2013, the contents of all of which are incorporated herein by reference in their entirety.

TECHNICAL FIELD

The present invention relates to radio transmitting devices and radio transmitting methods, in particular, to a radio transmitting device and a radio transmitting method using a plurality of frequency bands.

BACKGROUND ART

With regard to a radio transmitting device, the non-linearity of a power amplifier (PA) to amplify radio frequency (RF) signals has played a huge part in distorting RF signals to be transmitted. The distortion of the RF signal generates leakage power leaked to the outside of a desired frequency band used for transmission. The linear modulation has become a mainstream in the recent radio communication standard in order to improve the spectral efficiency. In the case of the linear modulation, a stringent limitation is set on the leakage power out of a desired band which arises due to the distortion of RF signals. Therefore, it is an important technical problem in the radio transmitting device to suppress the distortion of the RF signal to be transmitted.

On the other hand, toward the realization of further high-speed radio communication, the carrier aggregation (CA) technology has recently been used by which a plurality of fragmented frequency bands are gathered and utilized (see Patent Literature 1, for example). The CA technology makes it possible to secure a wide band by bundling a plurality of frequency bands and speed up transmission rates. In addition, it becomes possible by applying the CA technology to perform communication responding to a situation that discrete frequency bands are allocated to a plurality of operators or that a frequency band is shared.

The CA technology is classified according to frequency allocation of each carrier. As one of them, there is an Inter-band Non-contiguous CA mode in which each carrier frequency is allocated so that a difference between respective carrier frequencies $\Delta f$ may become sufficiently larger than a modulation bandwidth $f_{ee}$ of a RF signal used by each carrier. This CA mode technology makes it possible to improve the stability of the communication by performing communication simultaneously using a plurality of carrier frequencies whose propagation characteristics differ from each other.

A radio communications system using the above-mentioned CA technology requires a radio transmitting device and a radio transmitting method by which RF signals in a plurality of bands are transmitted. The above-mentioned radio transmitting device also requires suppressing the distortion of the RF signal. It is desirable in terms of making a device smaller and at lower cost that the radio transmitting device compatible with the CA technology should be able to amplify and transmit RF signals in a plurality of bands by means of a single power amplifier.

Patent Literature 2 describes an example of the radio transmitting device which transmits RF signals in a plurality of bands. FIG. 16 illustrates a configuration of a related radio transmitting device described in Patent Literature 2. The related radio transmitting device 100 is composed of two blocks of a dual-band transmitter 130 and a pre-distortion unit 120.

The dual-band transmitter 130 has the function of simultaneously transmitting RF signals with the carrier frequency $f_{c1}$ (band 1) and RF signals with the carrier frequency $f_{c2}$ (band 2). A baseband signal 115A corresponding to the band 1 is routed through a low pass filter 135A and converted into a RF signal with the carrier frequency $f_{c1}$ in a frequency converter which is composed of a local oscillation (LO) signal generator 140A and a mixer 145A. A baseband signal 115B corresponding to the band 2 is routed through a low pass filter 135B and converted into a RF signal with the carrier frequency $f_{c2}$ in a the frequency converter which is composed of a local oscillation (LO) signal generator 140B and a mixer 145B. The RF signal with the carrier frequency $f_{c1}$ and that with the $f_{c2}$ are synthesized in a power combiner 150 and then inputted into a power amplifier 160. The power amplifier 160 simultaneously amplifies the RF signal with the carrier frequency $f_{c1}$ and that with the $f_{c2}$, and outputs them as a RF signal 170.

The pre-distortion unit 120 has the function of compensating the distortion of the RF output signal 170 which is composed of the band 1 and the band 2 and is generated in the dual-band transmitter 130. That is to say, the pre-distortion unit 120 has non-linear input-output characteristics opposite to the input-output characteristics of the dual-band transmitter 130, by which it cancels the non-linearity of the dual-band transmitter 130.

In the case of transmitting the dual-band signals simultaneously, a frequency mixing effect arises due to the non-linearity of the dual-band transmitter 130. This makes a component in the band 1 of the RF output signal 170 depend on both of the baseband signal 115A in the band 1 and the baseband signal 115B in the band 2 which are inputted into the dual-band transmitter 130. For the same reason, a component in the band 2 of the RF output signal 170 depends on both of the baseband signal 115A in the band 1 and the baseband signal 115B in the band 2 which are inputted into the dual-band transmitter 130. In order to correct for the frequency mixing effect, a predistorter 125A generates the baseband signal 115A in the band 1 from both of an input baseband signal 110A in the band 1 and an input baseband signal 110B in the band 2, and outputs the baseband signal 115A. Similarly, a predistorter 125B generates the baseband signal 115B in the band 2 from both of the input baseband signal 110A in the band 1 and the input baseband signal 110B in the band 2, and outputs the baseband signal 115B.

[Citation List]
[Patent Literature]
[PTL 1]
Japanese Patent Application Laid-Open Publication No. 2012-216969 (paragraph [0005])
[PTL 2]
United States Patent Application Publication No. 2010/0316157 Description (paragraph [0042] and FIG. 10)

SUMMARY OF INVENTION

[Technical Problem]

However, the above-mentioned related radio transmitting device 100 has problems as described below.

The RF signal in the band 1 is represented by $x_1(t)$ and the RF signal in the band 2 is represented by $x_2(t)$, which are inputted into the power amplifier 160 included in the related radio transmitting device 100. Complex amplitudes of the RF signals of $x_1(t)$ and $x_2(t)$, that is, baseband signals carried by RF signals, are represented by $b_{x1}(t)$ and $b_{x2}(t)$ respectively. If the power amplifier 160 amplifies signals in two bands simultaneously, the non-linear characteristics of the power amplifier 160 depend on a set of complex amplitudes of two input signals $[b_{x1}(t), b_{x2}(t)]$. Here, it is assumed that the distortion of the RF output signal 170 from the power amplifier 160 is compensated when RF input signals with complex amplitudes of $[b_{xpd1}(t), b_{xpd2}(t)]$, to which the compensation for distortion by the pre-distortion has been applied, are inputted into the power amplifier 160.

The pre-distortion unit 120 outputs the baseband signals in the band 1 and band 2 of $[b_{xpd1}(t), b_{xpd2}(t)]$ to which the compensation for distortion by the pre-distortion has been applied. It is assumed that the complex amplitudes of RF signals in the band 1 and the band 2 which are inputted into the power amplifier 160 turn into $[b_{xpd1}(t-(\tau_d+\tau_c)), b_{xpd2}(t-\tau_c)]$ due to a delay in a path from the output of the pre-distortion unit 120 to the input of the power amplifier 160. In this case, there arises a problem that the distortion of the RF output signal 170 deteriorates due to a synchronous deviation $\tau_d$ between the band 1 and the band 2.

The reason is as follows. The non-linear characteristics of the power amplifier 160 depend on a set of two input signals $[b_{x1}(t), b_{x2}(t)]$. Therefore, the power amplifier 160 shows different characteristics depending on input signals which are $[b_{xpd1}(t)), b_{xpd2}(t)]$ or $[b_{xpd1}(t-(\tau_d+\tau_c)), b_{xpd2}(t-\tau_c)]$. Consequently, even if the compensation for distortion is performed on $[b_{xpd1}(t)), b_{xpd2}(t)]$, it does not follow that the compensation for distortion is performed on $[b_{xpd1}(t-(\tau_d+\tau_c)), b_{xpd2}(t-\tau_c)]$. If signals are delayed in each band by the same time $\tau_c$, and consequently the input signals turn from $[b_{xpd1}(t)), b_{xpd2}(t)]$ to $[b_{xpd1}(t-\tau_c)), b_{xpd2}(t-\tau_c)]$, there is no effect on the non-linear characteristics because the output signal of the latter is merely delayed by $\tau_c$ in comparison with the former.

The synchronous deviation $\tau_d$ between the RF signals in two bands arises in the above-mentioned related radio transmitting device 100 due to a difference in the delay time in the path from the input of the pre-distortion unit 120, that is, a distortion compensating circuit for each band, to the input of the power amplifier 160. Therefore, the related radio transmitting device 100 has the problem that it is impossible to avoid an increase in the amount of distortion of the RF output signal 170 due to an effect of the synchronous deviation $\tau_d$.

Thus, there has been a problem that the amount of distortion of the output signal increases due to a difference in delay times in a plurality of paths in a radio transmitting device transmitting RF signals in a plurality of bands.

The object of the present invention is to provide a radio transmitting device and a radio transmitting method that solve the problem mentioned above that the amount of distortion of the output signal increases due to a difference in delay times in a plurality of paths in a radio transmitting device transmitting RF signals in a plurality of bands.

[Solution to Problem]

A radio transmitting device according to an exemplary aspect of the present invention includes: a multi-band RF signal generator making each of a plurality of input baseband signals carried by a carrier wave with each of different frequencies, and outputting the carrier wave as a radio frequency signal; a power amplifier amplifying and outputting the radio frequency signal; a distortion compensation control signal generating unit applying a distortion compensating function, which compensates a distortion characteristic of the power amplifier, to the each of the plurality of input baseband signals; and a transmitter delay correction unit correcting a difference in delays which the plurality of input baseband signals receive respectively in the multi-band RF signal generator.

A radio transmitting method according to an exemplary aspect of the present invention includes: correcting a difference in delays which a plurality of input baseband signals receive respectively in generating a radio frequency signal obtained by making each of the plurality of input baseband signals carried by a carrier wave with each of different frequencies; and applying a distortion compensating function for compensating a distortion characteristic in amplifying the radio frequency signal to the plurality of baseband signals with the difference in delays corrected.

[Advantageous Effects of Invention]

According to the radio transmitting device and the radio transmitting method of the present invention, it is possible to suppress an increase in the amount of distortion of the output signal due to a difference in delay times in a plurality of paths.

BRIEF DESCRIPTION OF DRAWINGS

FIG. 1 is a block diagram illustrating a configuration of a radio transmitting device in accordance with a first exemplary embodiment of the present invention.

DESCRIPTION OF EMBODIMENTS

Figure 2A:
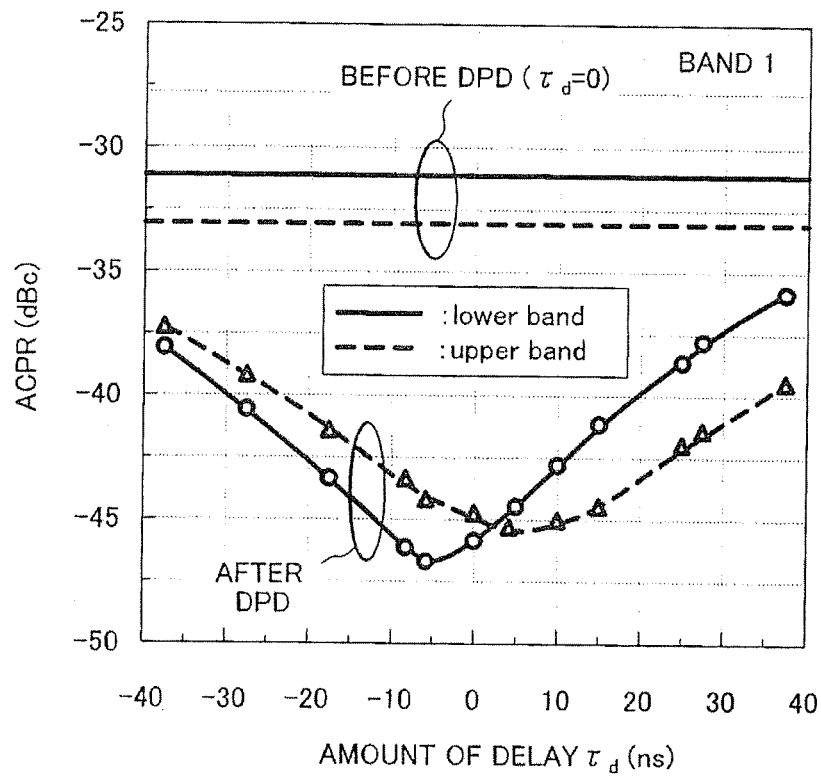
FIG. 2A is a diagram illustrating measurement results of the amount of distortion of RF signals in band 1 which are outputted from a power amplifier included in the radio transmitting device in accordance with the first exemplary embodiment of the present invention.

Exemplary embodiments of the present invention will be described with reference to drawings below. Here, in the following description, the same reference sign is attached to the same part or corresponding part, and its description can be omitted.

First, the outline of exemplary embodiments of the present invention will be described. A radio transmitting device in accordance with exemplary embodiments of the present invention has a main feature of including a power amplifier, compatible with the carrier aggregation (CA) technology, which can simultaneously amplify signals with a plurality of frequencies generated by a signal generator.

That is to say, the radio transmitting device in accordance with exemplary embodiments of the present invention includes a multi-band RF signal generator, a power amplifier, a distortion compensation control signal generating unit, and a transmitter delay correction unit. The multi-band RF signal generator makes each of a plurality of input baseband signals carried by a carrier wave with different frequency, and outputs it as a radio frequency (RF) signal. The power amplifier simultaneously amplifies the RF signals, composed of carrier waves with a plurality of frequencies, which are outputted from the multi-band RF signal generator, and outputs them.

The distortion compensation control signal generating unit applies a distortion compensating function, which compensates distortion characteristics of the power amplifier, to each of a plurality of input baseband signals, and outputs it. That is to say, the distortion compensation control signal generating unit applies the distortion compensating functions to a plurality of input baseband signals inputted from the transmitter delay correction unit. Here, the distortion compensating function is determined on the basis of a plurality of input baseband signals and output baseband signals which are carried by the RF signals with a plurality of carrier frequencies which are outputted from the power amplifier. By using the distortion compensating function, the distortion compensation control signal generating unit generates a correction baseband signal to eliminate the distortion of the RF signals in each carrier frequency band which are outputted from the power amplifier.

The transmitter delay correction unit corrects a difference in delays which pluralities of input baseband signals receive respectively in the multi-band RF signal generator. That is to say, the transmitter delay correction unit corrects the synchronization between the plural input baseband signals so as to correct the difference in delay time in each band arising in the RF signal generator, and then outputs them to the distortion compensation control signal generating unit.

As mentioned above, in the radio transmitting device according to the exemplary embodiments of the present invention, it becomes possible for the transmitter delay correction unit to correct a synchronous deviation due to the delay time in the path from the distortion compensation control signal generating unit to the power amplifier, that is, a synchronous deviation between the input signals of the power amplifier in respective bands. This makes it possible to solve the problem that the distortion characteristics of the RF output signals of the power amplifier deteriorate due to the synchronous deviation. As a result, according to the radio transmitting device in the exemplary embodiments of the present invention, it becomes possible to transmit signals without distortion even if the power amplifier having non-linear input-output characteristics is used.

A First Exemplary Embodiment

FIG. 1 is a block diagram illustrating a configuration of a radio transmitting device in accordance with a first exemplary embodiment of the present invention. The radio transmitting device 1000 includes a transmitter delay correction unit 1101, a distortion compensation control signal generating unit 1102, a multi-band RF signal generator 1002, and a power amplifier 1003, at least. In the above configuration, in particular, the transmitter delay correction unit 1101 is a characteristic configuration of the radio transmitting device 1000 in accordance with the present exemplary embodiment.

The radio transmitting device 1000 has a function of transmitting simultaneously RF signals in a plurality of frequency bands of carrier waves. Here, it is assumed that the number of the bands for transmission is "n". The radio transmitting device 1000 performs a different operation during a transmission period to transmit information signals from an operation during a training period to identify the non-linear characteristics of the power amplifier 1003. That is to say, the radio transmitting device 1000 identifies the non-linear characteristics of the power amplifier 1003 during the training period. Then, during the transmission period, the radio transmitting device 1000 compensates the distortion of RF output signals of the power amplifier 1003 on the basis of the identified non-linear characteristics.

First, the operation of the radio transmitting device 1000 will be described which is performed during the training period to identify the non-linear characteristics of the power amplifier 1003. For the sake of shorthand, the maximum value of amplitudes of each signal is normalized so as to be the same value (for example, "1") unless otherwise stated in the following description.

Baseband signals composed of n pieces, that is, $z(t)=[z_1(t), \ldots, z_n(t)])$, are inputted into the transmitter delay correction unit 1101 through terminals $1011_1, \ldots, 1011_n$. Here, $z_j(t)$ represents a baseband signal which is transmitted by using a band j (j=1, \ldots, n). During the training period, processes are not performed in the transmitter delay correction unit 1101 and the distortion compensation control signal generating unit 1102. Therefore, the baseband signals $z(t)=[z_1(t), \ldots, z_n(t)])$ inputted into the transmitter delay correction unit 1101 are outputted without change to terminals $1012_1, \ldots, 1012_n$ as output signals of the distortion compensation control signal generating unit 1102 $w(t)=[w_1(t), \ldots, w_n(t)]$.

The multi-band RF signal generator 1002 generates RF signals $x(t)=[x_1(t), \ldots, x_n(t)]$ by frequency-converting each component $[w_1(t), \ldots, w_n(t)]$ of the baseband signals $w(t)$ inputted from the terminals $1012_1, \ldots, 1012_n$ into respective carrier frequencies of band 1, ..., band n, and outputs them through a terminal 1013.

The multi-band RF signal generator 1002 has a delay time of $\tau_{TX1}, \ldots, \tau_{TXn}$ in each of band 1, ..., n. The delay times $\tau_{TX1}, \ldots, \tau_{TXn}$ can be determined by measuring the input signals $w(t)=[w_1(t), \ldots, w_n(t)]$ and the output signals $x(t)=[x_1(t), \ldots, x_n(t)]$ of the multi-band RF signal generator 1002 with an external measuring instrument such as an oscilloscope and comparing each component of the input signals $w(t)$ and each component of the output signals $w(t)$, for example.

Here, it is assumed that $b_x(t)=[b_{x1}(t), \ldots, b_{xn}(t)]$ represent complex amplitudes of the RF signals $x(t)=[x_1(t), \ldots, x_n(t)]$ inputted into the power amplifier 1003, that is, baseband signals carried by the RF signals. Then, the complex amplitudes $b_x(t)=[b_{x1}(t), \ldots, b_{xn}(t)]$ of the RF signals $x(t)$ inputted into the power amplifier 1003 become waveforms obtained by delaying the original baseband signals $z(t)=[z_1(t), \ldots, z_n(t)]$, and are expressed by the following formula (1).

$$b_x(t)=[b_{x1}(t),\ldots,b_{xn}(t)]=[z_1(t-\tau_{TX1}),\ldots,z_n(t-\tau_{TXn})] \quad (1)$$

Here, the right-hand side of formula (1) is defined as $z_{in}(t)$, that is, $z_{in}(t)=[z_1(t-\tau_{TX1}), \ldots, z_n(t-\tau_{TXn})]$.

The respective band components $x_1(t), \ldots, x_n(t)$ of the RF signal $x(t)$ which are simultaneously inputted into the power amplifier 1003 through the terminal 1013 are amplified and outputted to a terminal 1014 as RF signals $y(t)=[y_1(t), \ldots, y_n(t)]$.

It is assumed that $b_y(t)=[b_{y1}(t), \ldots, b_{yn}(t)]$ represents each complex amplitude of the RF signals $y(t)=[y_1(t), \ldots, y_n(t)]$ outputted from the power amplifier 1003. At this time, the relation is expressed by the following formula (2) between the complex amplitudes $b_x(t)=[b_{x1}(t), \ldots, b_{xn}(t)]$ of the input signals of the power amplifier 1003 and the complex amplitudes $b_y(t)=[b_{y1}(t), \ldots, b_{yn}(t)]$ of the output signals of the power amplifier 1003.

$$b_{y1}(t)=g_1[b_{x1}(t),\ldots,b_{xn}(t)],$$
$$\ldots,$$
$$b_{yn}(t)=g_n[b_{x1}(t),\ldots,b_{xn}(t)] \quad (2)$$

The reason is that, as described in Background Art, in the case of transmitting the signals in the plural bands simultaneously, the component in each band of the RF output signals depends on the baseband signals in all bands which are inputted into the transmitter because the frequency mixing effect arises due to the non-linearity of the transmitter. Here, each of $g_1, \ldots, g_n$ is a non-linear function whose arguments are n pieces of variables $b_{x1}(t), \ldots, b_{xn}(t)$, and expresses the non-linearity of the input-output characteristics in each band of the power amplifier 1003.

The same meaning of formula (2) can also be expressed by the following formula (3).

$$b_y(t)=g[b_x(t)] \quad (3)$$

Here, g represents a non-linear mapping and expresses a set of functions $g_1, \ldots, g_n$ collectively.

It is also possible to describe the relation between the input signal and the output signal of the power amplifier 1003 by the following formula (4) in which the input-output relation is the reverse of that in formula (2).

$$b_{x1}(t)=h_1[b_{y1}(t),\ldots,b_{yn}(t)],$$
$$\ldots,$$
$$b_{xn}(t)=h_n[b_{y1}(t),\ldots,b_{yn}(t)] \quad (4)$$

Here, each of $h_1, \ldots, h_n$ is a non-linear function whose arguments are n pieces of variables $b_{y1}(t), \ldots, b_{yn}(t)$. The same meaning of formula (4) can also be expressed by the following formula (5).

$$b_x(t)=h[b_y(t)] \quad (5)$$

Here, h represents a non-linear mapping and expresses a set of functions $h_1, \ldots, h_n$ collectively. The non-linear mapping g shown in formula (3) and the non-linear mapping shown in formula (5) have a relation of the inverse mapping with each other.

During the training period, the complex amplitudes $b_x(t)=[b_{x1}(t), \ldots, b_{xn}(t)]$ and $b_y(t)=[b_{y1}(t), \ldots, b_{yn}(t)]$ in the input-output of the power amplifier 1003 are measured. The functions $h_1, \ldots, h_n$ expressed by formula (4) are obtained by using as independent variables the complex amplitudes $b_y(t)=[b_{y1}(t), \ldots, b_{yn}(t)]$ of the output signals of the power amplifier 1003 which have been measured during the training period, and using as dependent variables the complex amplitudes $b_x(t)=[b_{x1}(t), \ldots, b_{xn}(t)]$ of the input signals of the power amplifier 1003 which have been measured similarly. They are numerically determined by a look-up table (LUT) or a polynomial fitting, for example.

Next, the operation will be described during the transmission period when the radio transmitting device 1000 illustrated in FIG. 1 transmits information signals.

During the transmission period, the baseband signals $z(t)=[z_1(t), \ldots, z_n(t)]$ corresponding to the bands 1, ..., n are inputted into the transmitter delay correction unit 1101. The baseband signal components $z_j(t)$ of the band j (j=1, ..., n) branch and are inputted into n pieces of variable delay means $1101_{kj}$ (k=1, ..., n), respectively. Then they are delayed by a delay time $\tau_{kj}$ in the variable delay means $1101_{kj}$, and $v_{kj}(t)=z_j(t-\tau_{kj})$ are outputted to terminals $1021_{kj}$. The delay time $\tau_{kj}$ in the variable delay means $1101_{kj}$ can be set freely. For example, the delay time $\tau_{kj}$ can be set as shown in the following formula (6).

$$\tau_{kj}=\tau_{TXj}-\tau_{TXk}+\tau_C(k,j=1,\ldots,n) \quad (6)$$

Here, $\tau_C$ represents a constant delay time, which can be set for any given value. However, it is desirable to be set to $\tau_C$=Max $(|\tau_{TXj}-\tau_{TXk}|)$ considering the condition that the implemented delay time $\tau_{kj}$ (k, j=1, ..., n) must be non-negative. Here, "Max" represents a maximum value.

The baseband signals $v_{jk}(t)$ outputted to the terminals $1021_{kj}$ are inputted into the distortion compensation control signal generating unit 1102. The distortion compensation control signal generating unit 1102 includes a distortion compensation control signal generating unit 1102*j* corresponding to the band j (j=1, ..., n). The distortion compensation control signal generating unit 1102*j* receives n pieces of baseband signals $v_{jk}(t)$ (k=1, ..., n) inputted from the transmitter delay correction unit 1101, substitutes them into the function $h_j$ obtained during the training period, and outputs them as baseband signals with $w_j(t)$ to the terminals $1012_j$. That is to say, the baseband signals $w(t)=[w_1(t), \ldots, w_n(t)]$ outputted from the distortion compensation control signal generating unit 1102 are given by the following formula (7).

$$w_1(t)=h_1[v_{11}(t),\ldots,v_{1n}(t)]=h_1[z_1(t-\tau_{11}),\ldots z_n(t-\tau_{1n})],$$
$$\ldots,$$
$$w_n(t)=h_n[v_{n1}(t),\ldots,v_{nn}(t)]=h_n[z_1(t-\tau_{n1}),\ldots z_n(t-\tau_{nn})] \quad (7)$$

The multi-band RF signal generator 1002 frequency-converts the respective components $w_1(t), \ldots, w_n(t)$ of the baseband signal w(t) inputted from the terminals $1012_1, \ldots, 1012_n$ into the carrier frequencies of band 1, ..., band n respectively during the transmission period just as during the training period. And the multi-band RF signal generator 1002 generates RF signals $x(t)=[x_1(t), \ldots, x_n(t)]$ and outputs them to the terminal 1013.

The complex amplitudes $b_x(t)=[b_{x1}(t), \ldots, b_{xn}(t)]$ of the RF signals x(t) inputted into the power amplifier 1003 through the terminal 1013 are affected by the influence of the delay times $\tau_{TX1}, \ldots, \tau_{TXn}$ of respective bands 1, ..., n in the multi-band RF signal generator 1002. That is to say, setting $t=t-\tau_{TXj}$ in formula (7) and using formula (6), the complex amplitudes $b_x(t)$ become waveforms expressed by the following formula (8).

$$b_{x1}(t)=w_1(t-\tau_{TX1})=h_1[z_1(t-(\tau_{TX1}+\tau_C)), \ldots, z_n(t-(\tau_{Xn}+\tau_C))],$$

$$\ldots,$$

$$b_{xn}(t)=w_n(t-\tau_{TXn})=h_n[z_1(t-(\tau_{TX1}+\tau_C)), \ldots, z_n(t-(\tau_{TXn}+\tau_C))] \quad (8)$$

Here, using the complex amplitudes $z_{in}(t)=[z_1(t-\tau_{TX1}), \ldots, z_n(t-\tau_{TXn})]$ of the RF input signals of the power amplifier 1003 during the training period which are defined by the right-hand side of formula (1), formula (8) can be organized as the following formula (9).

$$b_x(t)=h[z_{in}(t-\tau_C)] \quad (9)$$

The RF signals x(t) having complex amplitudes $b_x(t)$ given by formula (9) are inputted into the power amplifier 1003, and the RF signals y(t) having complex amplitudes $b_y(t)$ are outputted from the power amplifier 1003 to the terminal 1014. The multi-band RF signals y(t) outputted to the terminal 1014 are used for the transmission.

If the RF signals having the complex amplitudes $b_x(t)$ expressed by formula (9) are inputted into the power amplifier 1003, the complex amplitudes $b_y(t)$ of the RF signals outputted from the power amplifier 1003 are given by the following formula (10) due to the input-output characteristics of the power amplifier 1003 expressed by formula (3).

$$b_y(t)=g[b_x(t)]=g.h[z_{in}(t-\tau_C)]=z_{in}(t-\tau_C) \quad (10)$$

In formula (10), since the non-linear mapping g and the non-linear mapping h have a relation of the inverse mapping with each other, they cancel each other out. That is to say, it can be seen from formula (10) that the effect of the non-linearity g of the power amplifier 1003 is removed from the complex amplitudes $b_y(t)$ of the RF signals outputted from the power amplifier 1003 in the radio transmitting device 1000 according to the present exemplary embodiment. As a result, the original baseband signals z(t) inputted into the radio transmitting device 1000 are transmitted without distortion carried by the RF output signals of the power amplifier 1000. That is to say, according to the radio transmitting device of the present exemplary embodiment, it is possible to suppress an increase in the amount of distortion of the output signal due to a difference in delay times in a plurality of paths.

Figure 2B:
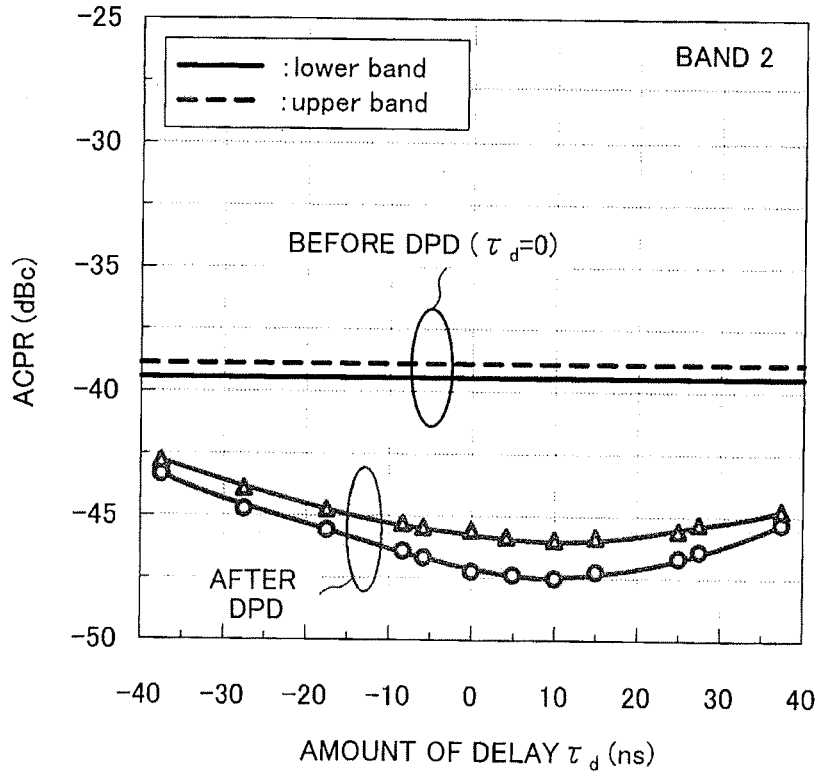
FIG. 2B is a diagram illustrating measurement results of the amount of distortion of RF signals in band 2 which are outputted from a power amplifier included in the radio transmitting device in accordance with the first exemplary embodiment of the present invention.

FIG. 2A and FIG. 2B show measurement results of the amount of distortion of the RF signals y(t) outputted from the power amplifier 1003 in the radio transmitting device 1000 shown in FIG. 1. A case is illustrated here in which RF input signals in two bands are transmitted. FIG. 2A shows measurement results with regard to the band 1, and FIG. 2B shows measurement results with regard to the band 2. Each figure shows the results before and after applying the dual predistortion (DPD). An adjacent channel leakage power ratio (ACPR) is used as the amount of distortion. In the measurement results shown in FIGS. 2A and 2B, a modulation wave of the WCDM (wideband code division multiple access (a registered trademark)) signals is used as the baseband signals z(t) to be transmitted both in the band 1 and in the band 2.

In the measurement results shown in FIGS. 2A and 2B, the horizontal axis represents a synchronous deviation time $\tau_d$ between the RF signals in two bands. A case where the delay time in the transmitter delay correction unit 110 is set at a value given by formula (6) corresponds to a case of $\tau_d=0$ in FIGS. 2A and 2B. If the complex amplitudes of the RF input signals of the power amplifier 1003 in a state of $\tau_d=0$ are represented by $[b_{xPD1}(t), b_{xPD2}(t)]$, the complex amplitudes in a state of $\tau_d \neq 0$ become $[b_{xPD1}(t-\tau_d), b_{xPD2}(t)]$. In the case of $\tau_d=0$, it can be seen from the results shown in FIGS. 2A and 2B that good effects of improving the distortion can be obtained after compensating the distortion. On the other hand, when the synchronous deviation time $\tau_d$ between the band 1 and the band 2 increases, the distortion characteristics after the distortion compensation deteriorate as shown by the measurement results in FIGS. 2A and 2B. Therefore, it is desirable in simultaneously amplifying multiband signals to set the delay time in the transmitter delay correction unit 1101 at the value given by formula (6). That is to say, in order to highly retain capacity for compensating a distortion, it is desirable to synchronize the RF signal inputted into the power amplifier 1003 with that in each other band, that is, to set the synchronous deviation time $\tau_d$ at zero.

Figure 3:
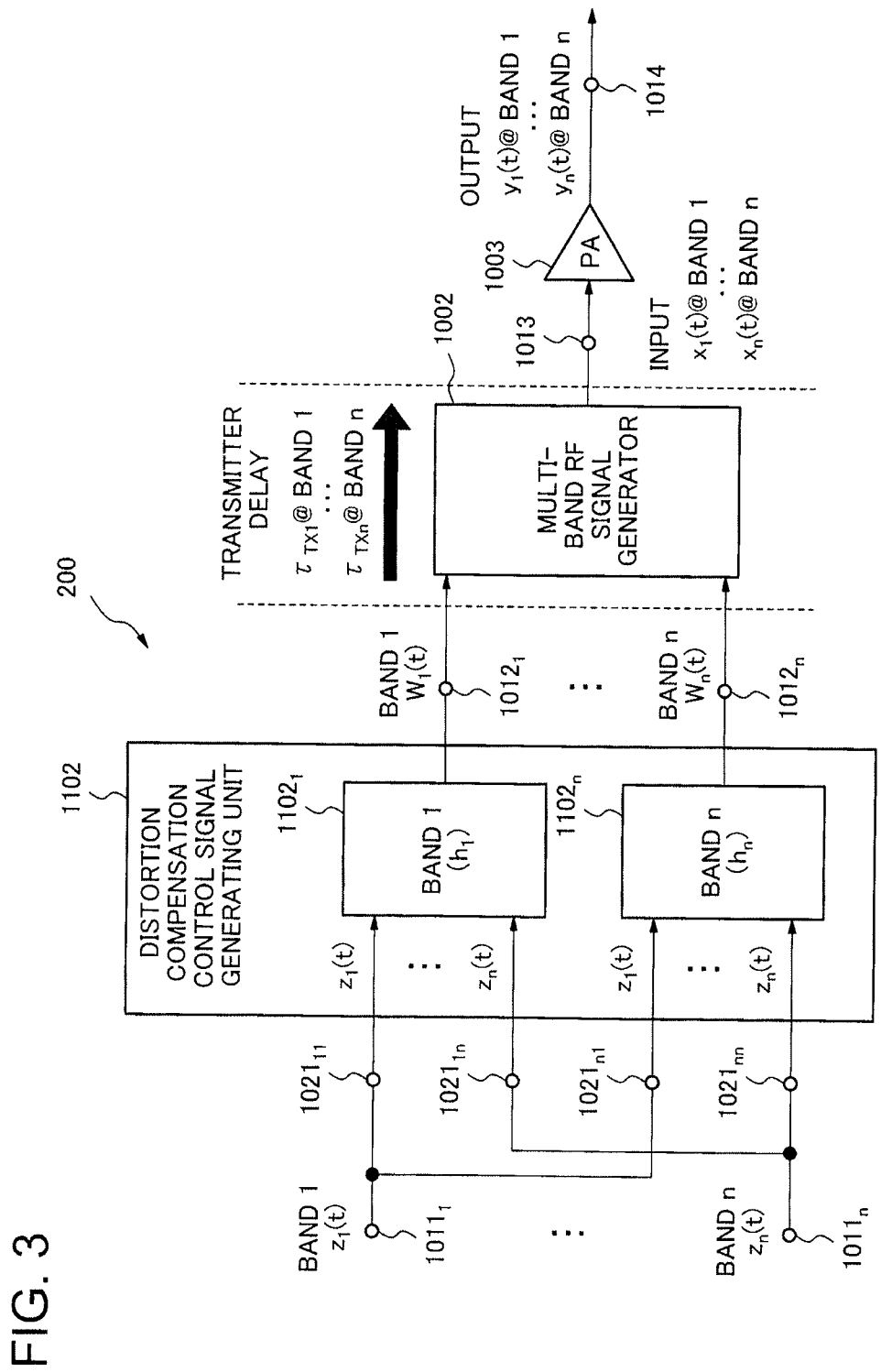
FIG. 3 is a block diagram illustrating a configuration of a related radio transmitting device.
Figure 16:
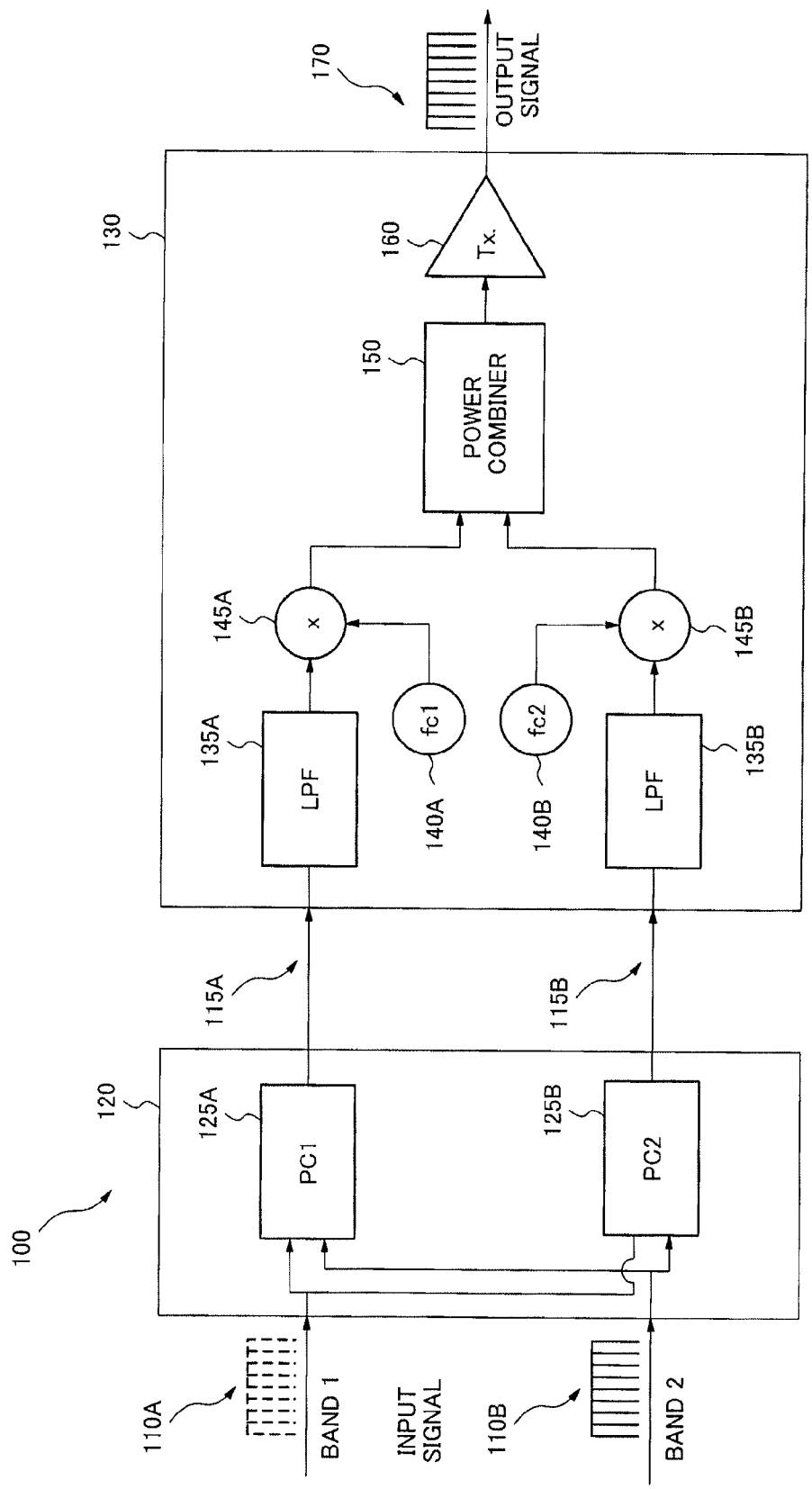
FIG. 16 is a block diagram illustrating a configuration of a related radio transmitting device.

Next, the operation of the transmitter delay correction unit 1101, which is the feature of the present exemplary embodiment, will be described in further detail. For comparison, the operation of a radio transmitting device without the transmitter delay correction unit 1101 will be described. FIG. 3 illustrates a configuration of a related radio transmitting device 200 without the transmitter delay correction unit 1101. This corresponds to the configuration of the related radio transmitting device 100 shown in FIG. 16.

The operation of the related radio transmitting device 200 during the training period is the same as that of the radio transmitting device 1000 according to the present exemplary embodiment shown in FIG. 1, and therefore its description is omitted.

During the transmission period, the baseband signals $z(t)=[z_1(t), \ldots, z_n(t)]$ are inputted into the distortion compensation control signal generating units $1102_j$ (j=1,...,n) in the distortion compensation control signal generating units 1102, respectively. The distortion compensation control signal generating unit $1102_j$ substitutes the inputted base band signals $z(t)=[z_1(t), \ldots, z_n(t)]$ into the function $h_j$ obtained during the training period, and outputs them as the baseband signals with $w_j(t)$ to the terminals $1012_j$. That is to say, the baseband signals $w(t)=[w_1(t), \ldots, w_n(t)]$ outputted from the distortion compensation control signal generating unit 1102 are given by the following formula (11).

$$w_1(t)=h_1[z_1(t), \ldots, z_n(t)],$$

$$\ldots,$$

$$w_n(t)=h_n[z_1(t), \ldots, z_n(t)] \quad (11)$$

The multi-band RF signal generator 1002 generates the RF signals $x(t)=[x_1(t), \ldots, x_n(t)]$ which are obtained by frequency-converting the respective components $w_1(t), \ldots, w_n(t)$ of the baseband signal w(t) inputted from the terminals $1012_1, \ldots, 1012_n$ into the carrier frequencies of band 1, ..., band n respectively, and outputs them to the terminal 1013. The complex amplitudes $b_x(t)=[b_{x1}(t), \ldots, b_{xn}(t)]$ of the RF signals inputted into the power amplifier 1003 become waveforms expressed by the following formula (12) due to the delay times $\tau_{TX1}, \ldots, \tau_{TXn}$ of the bands $1, \ldots, n$ in the multi-band RF signal generator 1002.

$$b_{x1}(t) = w_1(t-\tau_{TX1}) = h_1[z_1(t-\tau_{TX1}), \ldots, z_n(t-\tau_{TX1})],$$

$$\ldots,$$

$$b_{xn}(t) = wn = (t-\tau_{TXn}) = h_n[z1(t-\tau_{TXn}), \ldots, z_n(t-\tau_{TXn})] \quad (12)$$

In this case, the arguments of the function $h_1$ are $z(t-\tau_{TX1}) = [z_1(t-\tau_{TX1}), \ldots, z_n(t-\tau_{TX1})], \ldots$, and the arguments of the function $h_n$ become $z(t-\tau_{TXn}) = [z_1(t-\tau_{TXn})]$. If the RF signals, which have the complex amplitudes $b_x(t)$ generated by substituting a different argument into each of the functions $h_1, \ldots, h_n$ as formula (12), are inputted into the power amplifier 1003, it is impossible to remove the effects of the non-linearity g of the power amplifier 1003 from the RF output signals of the power amplifier 1003. The reason is as follows.

In the case of the radio transmitting device 1000 according to the present exemplary embodiment shown in FIG. 1, the complex amplitudes $b_x(t)$ in the input of the power amplifier 1003 are generated by substituting the same argument $z_{in}(t-\tau_C) = [z_1(t-(\tau_{TX1}+\tau_C)), \ldots, z_n(t-(\tau_{TXn}+\tau_C))]$ into the functions $h_1, \ldots, h_n$ as shown by formula (8). Thus, if the arguments of the functions $h_1, \ldots, h_n$ are the same, the complex amplitudes $b_x(t)$ can be expressed as a whole by a single formula using the mapping h as shown in formula (9). At this time, as shown in formula (10), the mapping h of the complex amplitudes and the non-linearity g of the power amplifier cancel each other out in the RF output signals of the power amplifier 1003. Therefore, it becomes possible to transmit the baseband signals z(t) without distortion carried by the RF output signals of the power amplifier 1003.

On the other hand, in the related radio transmitting device 200 shown in FIG. 3, the condition is not satisfied that the complex amplitudes of each band in the input of the power amplifier 1003 are generated by substituting the same argument into the functions $h_1, \ldots, h_n$. In this case, it is impossible to cancel the above-mentioned non-linearity g of the power amplifier.

That is to say, the transmitter delay correction unit 1101, whose configuration is the feature of the radio transmitting device 1000 according to the present exemplary embodiment, is configured to make the input baseband signals carried by a single carrier wave branch into a plurality of parts corresponding to the number of different frequencies (bands), and add a delay time to each of divided input baseband signals. The delay time can be a difference between a delay which the input baseband signals carried by one carrier wave suffer in the multi-band RF signal generator and a delay which the input baseband signals carried by the other carrier wave suffer in the multi-band RF signal generator, respectively.

The configuration enables the transmitter delay correction unit 1101 to perform the synchronization control on each component $[z_1(t), \ldots, z_n(t)]$ of the original baseband signal z(t) so that the above-mentioned condition may be satisfied. The condition is that "each band component $[b_{x1}(t), \ldots, b_{xn}(t)]$ of the complex signal $b_x(t)$ of the RF signal in the input of the power amplifier 1003 becomes a waveform generated by substituting the same argument into the distortion compensation function $h_1, \ldots, h_n$". Here, the delay times $\tau_{kj}$ (k,j=1, ..., n) in the transmitter delay correction unit 1101 shown by formula (6) satisfy the above-described condition.

Thus, according to the radio transmitting device 1000 of the present exemplary embodiment, it is possible to transmit the baseband signal z(t) without distortion carried by the RF output signal y(t) of the power amplifier even if the power amplifier having non-linear input-output characteristics is used in the multiband concurrent transmission.

A Second Exemplary Embodiment

Figure 4:
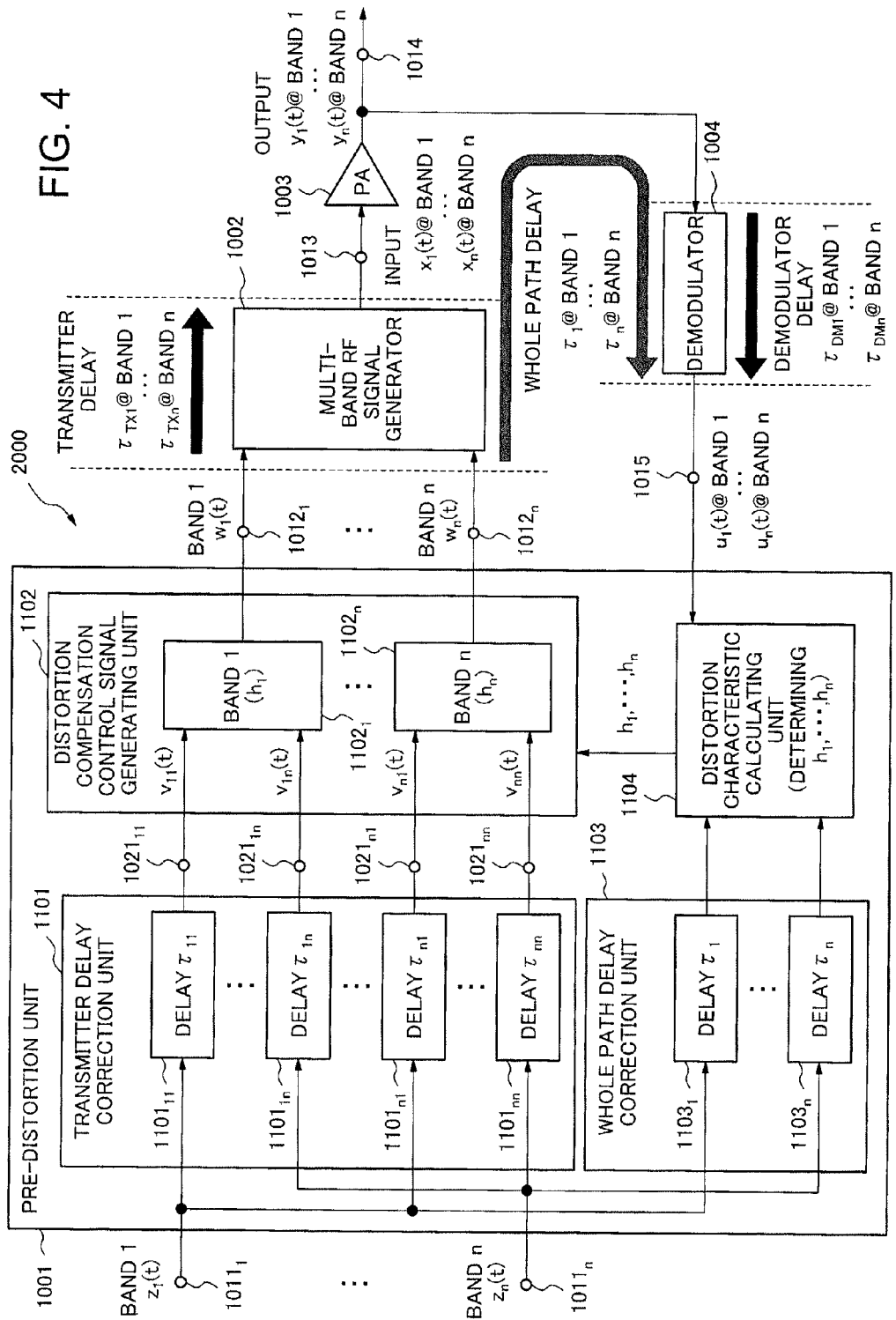
FIG. 4 is a block diagram illustrating a configuration of a radio transmitting device in accordance with a second exemplary embodiment of the present invention.

Next, a second exemplary embodiment of the present invention will be described. FIG. 4 is a block diagram illustrating a configuration of a radio transmitting device 2000 in accordance with the present exemplary embodiment. The radio transmitting device 2000 includes a pre-distortion unit 1001, the multi-band RF signal generator 1002, the power amplifier 1003, and a demodulator 1004. The pre-distortion unit 1001 includes the transmitter delay correction unit 1001, the distortion compensation control signal generating unit 1102, a whole path delay correction unit 1103, and a distortion characteristic calculating unit 1104.

The radio transmitting device 2000 has a function of transmitting simultaneously RF signals in plural bands as is the case with the radio transmitting device 1000 in accordance with the first exemplary embodiment. The radio transmitting device 2000 performs the distortion compensation of the RF output signals of the power amplifier 1003 during the transmission period on the basis of the non-linear characteristics of the power amplifier 1003 identified during the training period.

First, the operation of the radio transmitting device 2000 will be described which is performed during the training period to identify the non-linear characteristics of the power amplifier 1003. During the training period, processes are not performed in the transmitter delay correction unit 1101 and the distortion compensation control signal generating unit 1102. Therefore, the baseband signals $z(t) = [z_1(t), \ldots, z_n(t)]$ inputted into the transmitter delay correction unit 1101 are outputted without change to the terminals $1012_1, \ldots, 1012_n$ as output signals $w(t) = [w_1(t), \ldots, w_n(t)]$.

The multi-band RF signal generator 1002 generates the RF signals $x(t) = [x_1(t), \ldots, x_n(t)]$ by frequency-converting each component $[w_1(t), \ldots, w_n(t)]$ of the baseband signals w(t) inputted from the terminals $1012_1, \ldots, 1012_n$ into respective carrier frequencies of band 1, ..., band n, and outputs them to the terminal 1013. At this time, the relation between the complex amplitudes $b_x(t) = [b_{x1}(t), \ldots, b_{xn}(t)]$ of the RF input signals inputted into the power amplifier 1003 and the baseband signals $z(t) = [z_1(t), \ldots, z_n(t)]$ inputted into the transmitter delay correction unit 1101 is given by the above-mentioned formula (1) as is the case with the first exemplary embodiment.

Figure 5:
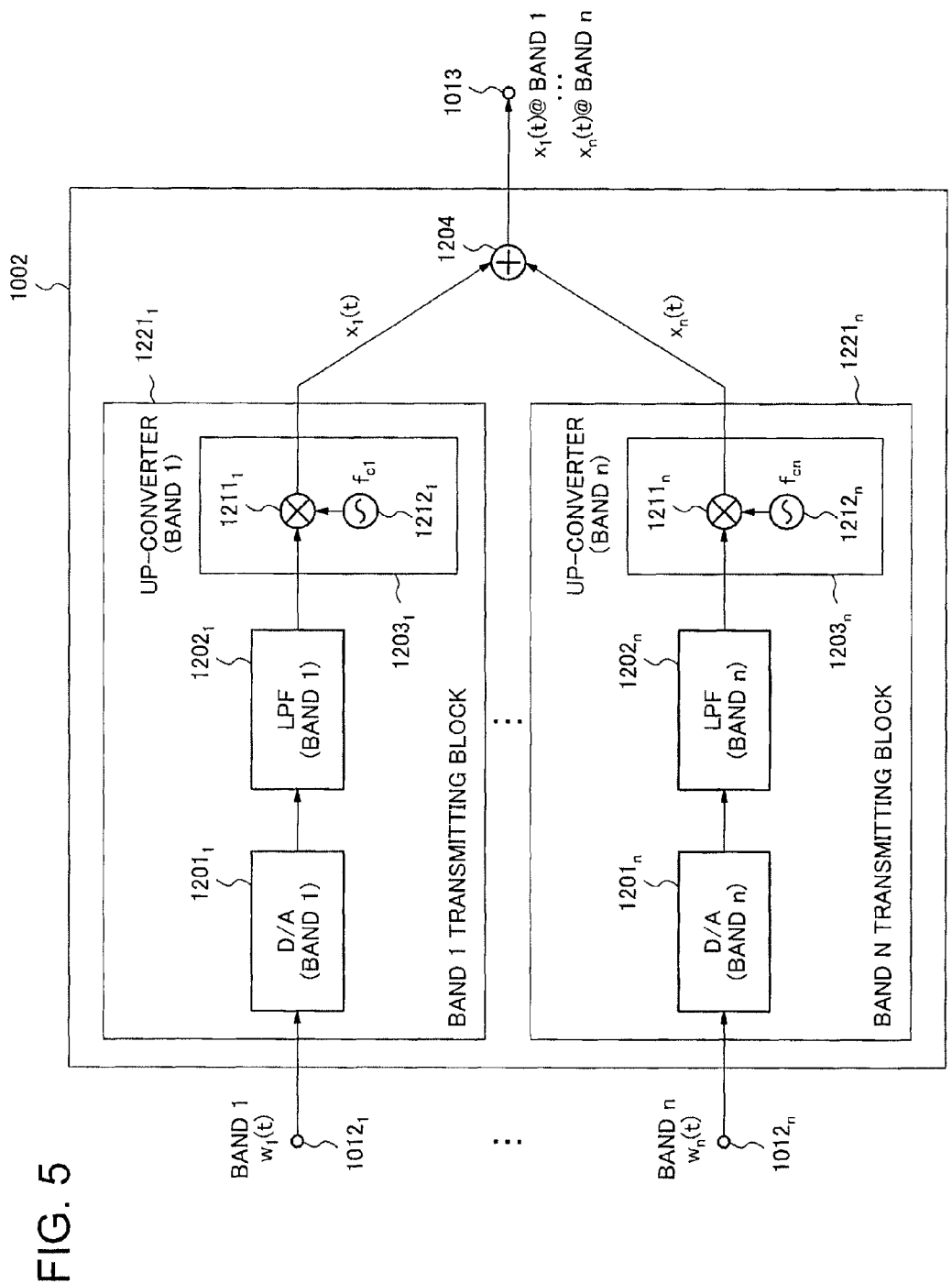
FIG. 5 is a block diagram illustrating a configuration of a multi-band RF signal generator included in the radio transmitting device in accordance with the second exemplary embodiment of the present invention.

FIG. 5 illustrates an example of the configuration of the multi-band RF signal generator 1002. The multi-band RF signal generator 1002 includes transmitting blocks $1221_1, \ldots, 1221_n$ for each band and a RF signal combiner 1204. The transmitting block $1221_j$ corresponding to each band j (j=1, ..., n) includes a digital-analog converter $1201_j$, a low-pass filter $1202_j$, and a frequency converter $1203_j$. The frequency converter $1203_j$ includes a mixer $1211_j$ and a local oscillation (LO) signal generator $1212_j$ at least.

The digital baseband signal $w_j(t)$ for the band j inputted into the terminal $1012_j$ is converted into an analog baseband signal in the digital-analog converter $1201_j$ and then outputted to the low-pass filter $1202_j$. The low-pass filter $1202_j$ removes unwanted high-frequency components from the inputted analog baseband signal and outputs it to the frequency converter $1203_j$. The LO signal generator $1212_j$ in the frequency converter $1203_j$ outputs the LO signal with the carrier frequency $f_{cj}$ corresponding to the band j. Then the mixer $1211j$ generates the RF signal $x_j(t)$ by mixing the inputted analog baseband signal and the LO signal, and outputs it.

The RF signals $x_1(t), \ldots, x_n(t)$ outputted from the transmitting blocks $1221_1, \ldots, 1221_n$ corresponding to each band are combined in the RF signal combiner 1204 and simultaneously outputted to the terminal 1013.

As shown in FIG. 4, respective band components $x_1(t), \ldots, x_n(t)$ of the RF signals $x(t)$, which are simultaneously inputted from the terminal 1013 into the power amplifier 1003, are amplified and outputted to the terminal 1014 as the RF signals $y(t)=[y_1(t), \ldots, y_n(t)]$.

The RF signals $y(t)$ outputted to the terminal 1014 are converted into baseband signals $u(t)=[u_1(t), \ldots, u_n(t)]$ in the demodulator 1004 and outputted to a terminal 1015. The baseband signals $u(t)$ outputted to the terminal 1015 are inputted into the pre-distortion unit 1001.

Figure 6:
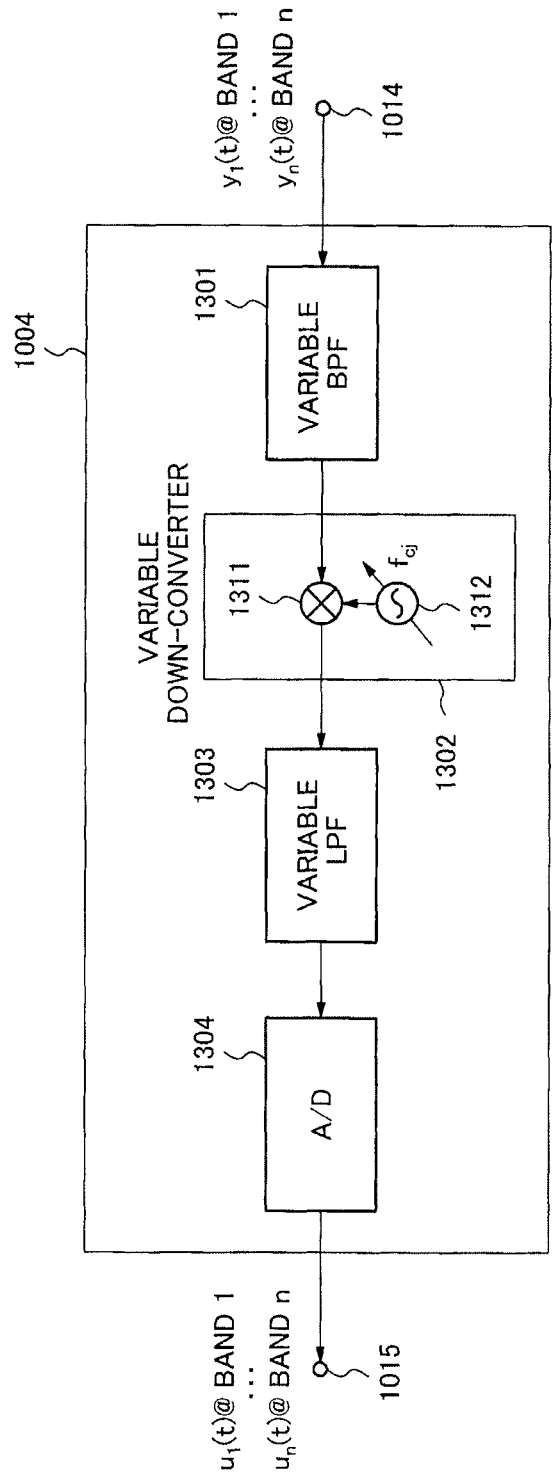
FIG. 6 is a block diagram illustrating a configuration of a demodulator included in the radio transmitting device in accordance with the second exemplary embodiment of the present invention.

FIG. 6 illustrates an example of the configuration of the demodulator 1004. The demodulator 1004 includes a variable band-pass filter 1301, a variable frequency converter 1302, a variable low-pass filter 130, and an analog-digital converter 1304 at least. The RF signals $y_1(t), \ldots, y_n(t)$ for each band, which are outputted from the power amplifier 1003, are simultaneously inputted into the input terminal 1014 of the demodulator 1004. The demodulator 1004 selects a band j from among the bands $1, \ldots, n$ and demodulates only the RF signal $y_j(t)$ on the band j.

The variable band-pass filter 1301 can make a passband vary without limitation. For example, the variable band pass filter 1301 sets a passband at the band j, makes only the RF signal $y_j(t)$ on the band j pass through, and outputs it to the variable frequency converter 1302. The variable frequency converter 1302 includes a mixer 1311 and a frequency variable LO signal generator 1312 at least. The frequency variable LO signal generator 1312 can make the frequency of the LO signal to be outputted vary without limitation. The frequency variable LO signal generator 1312 outputs a LO signal corresponding to the band j (frequency $f_{cj}$) to the mixer 1311. The mixer 1311 mixes the inputted RF signal $y_j(t)$ on the band j and the LO signal (frequency $f_{cj}$), converts the RF signal $y_j(t)$ into an analog baseband signal, and outputs it to the variable low-pass filter 1303.

The variable low-pass filter 1303 can make its cutoff frequency vary without limitation. The cutoff frequency of the variable low-pass filter 1303 is set depending on a bandwidth of the analog baseband signal corresponding to each band. The variable low pass filter 1303 removes unwanted high-frequency components in the inputted analog baseband signal and outputs it to the analog-digital converter 1304. The analog-digital converter 1304 converts the inputted analog baseband signal into a digital baseband signal $u_j(t)$ corresponding to the band j and outputs it to the terminal 1015. The digital baseband signal $u_j(t)$ outputted to the terminal 1015 is inputted into the pre-distortion unit 1001.

It has been completed by the above procedures to demodulate the RF signal $y_j(t)$ on the band j by the demodulator 1004 and input the digital baseband signal $u_j(t)$ into the pre-distortion unit 1001. Next, according to the same procedures, it is performed to demodulate the RF signal $y_k(t)$ on the band k different from the band j and input the digital baseband signal $u_k(t)$ into the pre-distortion unit 1001. By performing the procedure on every band k ($k=1, \ldots, n$), the digital baseband signals $u(t)=[u_1(t), \ldots, u_n(t)]$ are obtained.

Figure 7:
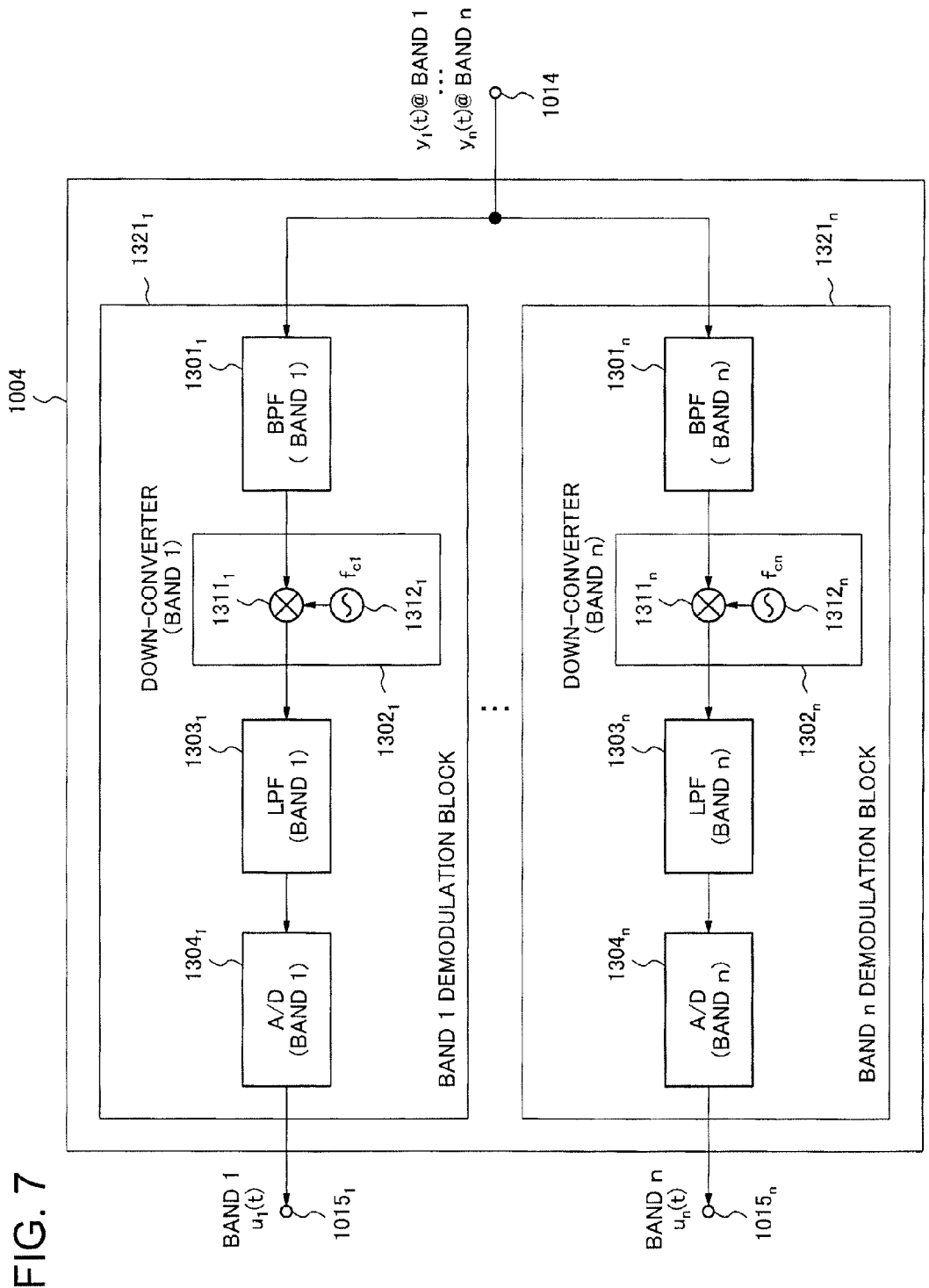
FIG. 7 is a block diagram illustrating another configuration of the demodulator included in the radio transmitting device in accordance with the second exemplary embodiment of the present invention.

FIG. 7 illustrates an example of another configuration of the demodulator 1004. The demodulator 1004 shown in FIG. 7 includes demodulation blocks $1321_1, \ldots, 1321_n$ for each band. The demodulation block $1321_j$ corresponding to the band j ($j=1, \ldots, n$) includes a band-pass filter $1301_j$, a frequency converter $1302_j$, a low pass-filter $1303_j$, and an analog-digital converter $1304_j$ at least. The RF signals $y_1(t), \ldots, y_n(t)$ on each band outputted from the power amplifier 1003 are simultaneously inputted into the input terminal 1014 of the demodulator 1004.

The passband of the band-pass filter $1301_j$ included in the demodulation block $1321_j$ for the band j is configured to make only the RF signal $y_j(t)$ on the band j pass through. The RF signal $y_j(t)$ passed through the band-pass filter $1301_j$ is inputted into the frequency converter $1302_j$. The frequency converter $1302_j$ includes a mixer $1311_j$ and a LO signal generator $1312_j$ at least. The LO signal generator $1312_j$ outputs the LO signal corresponding to the band j (frequency $f_{cj}$) to the mixer 1311. The mixer 1311 mixes the inputted RF signal $y_j(t)$ on the band j and the LO signal (frequency $f_{cj}$), converts the RF signal $y_j(t)$ into an analog baseband signal, and outputs it to the low-pass filter $1303_j$.

The cutoff frequency of the low-pass filter $1303_j$ is designed depending on a bandwidth of the analog baseband signal corresponding to each band. The low-pass filter $1303_j$ removes unwanted high-frequency components in the inputted analog baseband signal and outputs it to the analog-digital converter $1304_j$. The analog-digital converter $1304j$ converts the inputted analog baseband signal into a digital baseband signal $u_j(t)$ corresponding to the band j and outputs it to a terminal $1015_j$. The digital baseband signal $u_j(t)$ outputted to the terminal $1015j$ is inputted into the pre-distortion unit 1001. The baseband signals $u_1(t), \ldots, u_n(t)$ are outputted to terminals $1015_1, \ldots, 1015_n$ respectively.

The pre-distortion unit 1001 obtains the baseband signals $u(t)=[u_1(t), \ldots, u_n(t)]$ by the above procedures. Thus, according to the demodulator 1004 shown in FIG. 7, it is possible to perform simultaneously the demodulation process for every band k ($k=1, \ldots, n$).

There is a relation, which is expressed by the following formula (13), between the complex amplitudes $b_y(t)=[b_{y1}(t), \ldots, b_{yn}(t)]$ of the RF output signals $y(t)=[y_1(t), \ldots, y_n(t)]$ outputted from the power amplifier 1003 shown in FIG. 4 and the baseband signals $u(t)=[u_1(t), \ldots, u_n(t)]$ outputted from the demodulator 1004.

$$u(t)=[u_1(t), \ldots, u_n(t)]=[b_{y1}(t-\tau_{DM1}), \ldots, b_{yn}(t-\tau_{DMn})] \quad (13)$$

Here, delay times $\tau_{DM1}, \ldots, \tau_{DMn}$ represent delay times in the band $1, \ldots, n$ which arise in the demodulator 1004 respectively.

The whole path delay correction unit 1103 includes variable delay means $1103_1, \ldots, 1103_n$. Each delay time in the variable delay means $1103_1, \ldots, 1103_n$ is set at the same value as an amount of delay $\tau_1$ for each band on a path from each of the input terminals $1012_1, \ldots, 1012_n$ of the multi-band RF signal generator 1002 to the output terminal 1015 of the demodulator 1004. Here, the amount of delay $\tau_1$ is equal to the sum of delay times in the multi-band RF signal generator 1002 and the demodulator 1004, which can be expressed as follows.

The amount of delay $\tau_1 = \tau_{TX1} + \tau_{DM1}, \ldots, \tau_n = \tau_{TXn} + \tau_{DMn}$ Each component of the baseband signals $z(t)=[z_1(t), \ldots, z_n(t)]$ inputted into the transmitter delay correction unit 1101 is delayed by each of the variable delay means $1103_1, \ldots, 1103_n$ included in the whole path delay correction unit 1103. As a result, the whole path delay correction unit 1103 outputs the delayed baseband signals $z_d(t)=[z_1(t-\tau_1), \ldots, z_n(t-\tau_n)]$. Here, the variable delay means $1103_1, \ldots, 1103_n$ can be implemented by means of digital filters, for example.

It is possible to obtain by the following procedures the amount of delay for each band $\tau_1, \ldots, \tau_n$ on a path from each of the input terminals $1012_1, \ldots, 1012_n$ of the multi-band RF signal generator 1002 to the output terminal 1015 of the demodulator 1004.

First, the baseband signals $z_d(t)$ outputted from the whole path delay correction unit 1103 and the baseband signals u(t) outputted from the demodulator 1004 are inputted into the distortion characteristic calculating unit 1104 included in the pre-distortion unit 1001. By using a correlation function of the output signal $z_i(t-\tau_i)$ of the whole path delay correction unit 1103 for each band i (i=1, ..., n) and the output signal $u_i(t)$ of the demodulator 1004, the distortion characteristic calculating unit 1104 calculates the amount of delay of $z_i(t-\tau_i)$ and $u_i(t)$. Then the distortion characteristic calculating unit 1104 sets the amount of delay $\tau_i$ of the variable delay means $1103_i$ in the whole path delay correction unit 1103 so that a delay difference between $z_i(t-\tau_i)$ and $u_i(t)$ may be minimized.

It can be seen that the baseband signal $z_i(t-\tau_i)$ inputted from the whole path delay correction unit 1103 into the distortion characteristic calculating unit 1104 is identical with $b_{xi}(t-\tau_{DMi})$ because a formula, $b_{xi}(t)=z_i(t-\tau_{TXi})$, is satisfied according to above-mentioned formula (1). The baseband signal $u_i(t)$ inputted from the demodulator 1004 into the distortion characteristic calculating unit 1104 is identical with $b_{yi}(t-\tau_{DMi})$ according to above-mentioned formula (13). Therefore, it is found that the measurement data of the input complex amplitudes $b_{xi}(t-\tau_{DMi})$ and the output complex amplitudes $b_{yi}(t-\tau_{DMi})$ in each band i=1, ..., n of the power amplifier 1003 are inputted into the distortion characteristic calculating unit 1104.

The distortion characteristic calculating unit 1104 determines functions $h_1, \ldots, h_n$ necessary for the distortion compensation on the basis of the above-mentioned formula (4) or formula (5), and the measurement data of the complex amplitudes in each band $[b_{x1}(t-\tau_{DM1}), \ldots, b_{xn}(t-\tau_{DMn})]$, $[b_{y1}(t-\tau_{DM1}), \ldots, b_{yn}(t-\tau_{DMn})]$ of inputted input-output signals of the power amplifier 1003. The distortion characteristic calculating unit 1104 transmits the determined functions $h_1, \ldots, h_n$ to the distortion compensation control signal generating unit 1102.

The distortion characteristic calculating unit 1104 can be implemented by using a DSP (digital signal processor) or an FPGA (field programmable gate array). The distortion characteristic calculating unit 1104 can be configured to have a function as a look-up table (LUT) or a polynomial fitting to determine the functions $h_1, \ldots, h_n$.

The operation during the transmission period of the radio transmitting device 2000 according to the present exemplary embodiment is similar a to that during the transmission period of the radio transmitting device 1000 according to the first exemplary embodiment. That is to say, the baseband signals $z(t)=[z_1(t), \ldots, z_n(t)]$ inputted into the radio transmitting device 2000 are given synchronous corrections using the delay times $\tau_{kj}$ (k, j=1, ..., n) given by the above-mentioned formula (6) in the transmitter delay correction unit 1101, and then outputted to the distortion compensation control signal generating unit 1102. The distortion compensation control signal generating unit 1102 substitutes the baseband signals inputted from the transmitter delay correction unit 1101 into the functions $h_1, \ldots, h_n$, and outputs respective components of the baseband signals $w(t)=[w_1(t), \ldots, w_n(t)]$ given by formula (7) to the terminas $1012_1, \ldots, 1012_n$. Here, the variable delay means $1101_1, \ldots, 1101_n$ included in the transmitter delay correction unit 1101 can be implemented by digital filters, for example.

The distortion compensation control signal generating unit 1102 in the present exemplary embodiment is configured by digital circuits implemented by a DSP, an FPGA or the like. The distortion compensation control signal generating unit 1102 has a function of generating the baseband signals $w(t)=[w_1(t), \ldots, w_n(t)]$ obtained by substituting the baseband signals outputted from the transmitter delay correction unit 1101 into the functions $h_1, \ldots, h_n$.

The multi-band RF signal generator 1002 generates the RF signals $x(t)=[x_1(t), \ldots, x_n(t)]$ by frequency-converting each component $[w_1(t), \ldots, w_n(t)]$ of the baseband signals w(t) inputted from the terminals $1012_1, \ldots, 1012_n$ into respective carrier frequencies of band 1, ..., the band n. Then the multi-band RF signal generator 1002 inputs the RF signals x(t) into the power amplifier 1003 through the terminal 1013. Each band component $[x_1(t), \ldots, x_n(t)]$ of the RF signals x(t) simultaneously inputted into the power amplifier 1003 through the terminal 1013 is amplified and outputted to the terminal 1014 as the RF signals $y(t)=[y_1(t), \ldots, y_n(t)]$. The multi-band RF signals y(t) outputted to the terminal 1014 are used for transmission. At this time, the complex amplitude $b_y(t)$ of the RF signal y(t) outputted to the terminal 1014 is given by formula (10) as is the case with the first exemplary embodiment. Therefore, the original baseband signals z(t) inputted into the transmitter are transmitted without distortion carried by the RF output signals y(t) of the power amplifier 1003.

Although it has been described above that the radio transmitting device 2000 according to the present exemplary embodiment operates during the training period and the transmission period separately, it is also acceptable to perform the training operation during the transmission period. That is to say, it is also acceptable to determine the distortion compensation functions $h_1, \ldots, h_n$ by performing the training operation in the radio transmitting device 2000 simultaneously while communicating with another transmitting device using the RF output signals y(t) from the power amplifier 1003.

Since the whole path delay correction unit 1103, the distortion characteristic calculating unit 1104, and the demodulator 1004 are not used during the period without the training operation, it is possible to put these blocks into a non-operating (OFF) state.

As is the case with the first exemplary embodiment, also in the case of the present exemplary embodiment, the transmitter delay correction unit 1101 appropriately synchronizes the signals among respective bands inputted into the power amplifier 1003. As a result, it is possible to transmit the baseband signal z(t) without distortion carried by the RF output signal y(t) of the power amplifier 1003 even if the power amplifier 1003 having non-linear input-output characteristics is used in the multiband concurrent transmission.

(A First Modification of the Second Exemplary Embodiment)

Although the pre-distortion unit 1001 is implemented by using digital circuits in the above description, it is also acceptable to implement a part of the pre-distortion unit 1001 by using analog circuits.

For example, the variable delay means $1101_1, \ldots, 1101_n$ included in the transmitter delay correction unit 1101 and the variable delay means $1103_1, \ldots, 1103_n$ included in the whole path delay correction unit 1103 can be implemented by using analog filters instead of digital filters.

Figure 8:
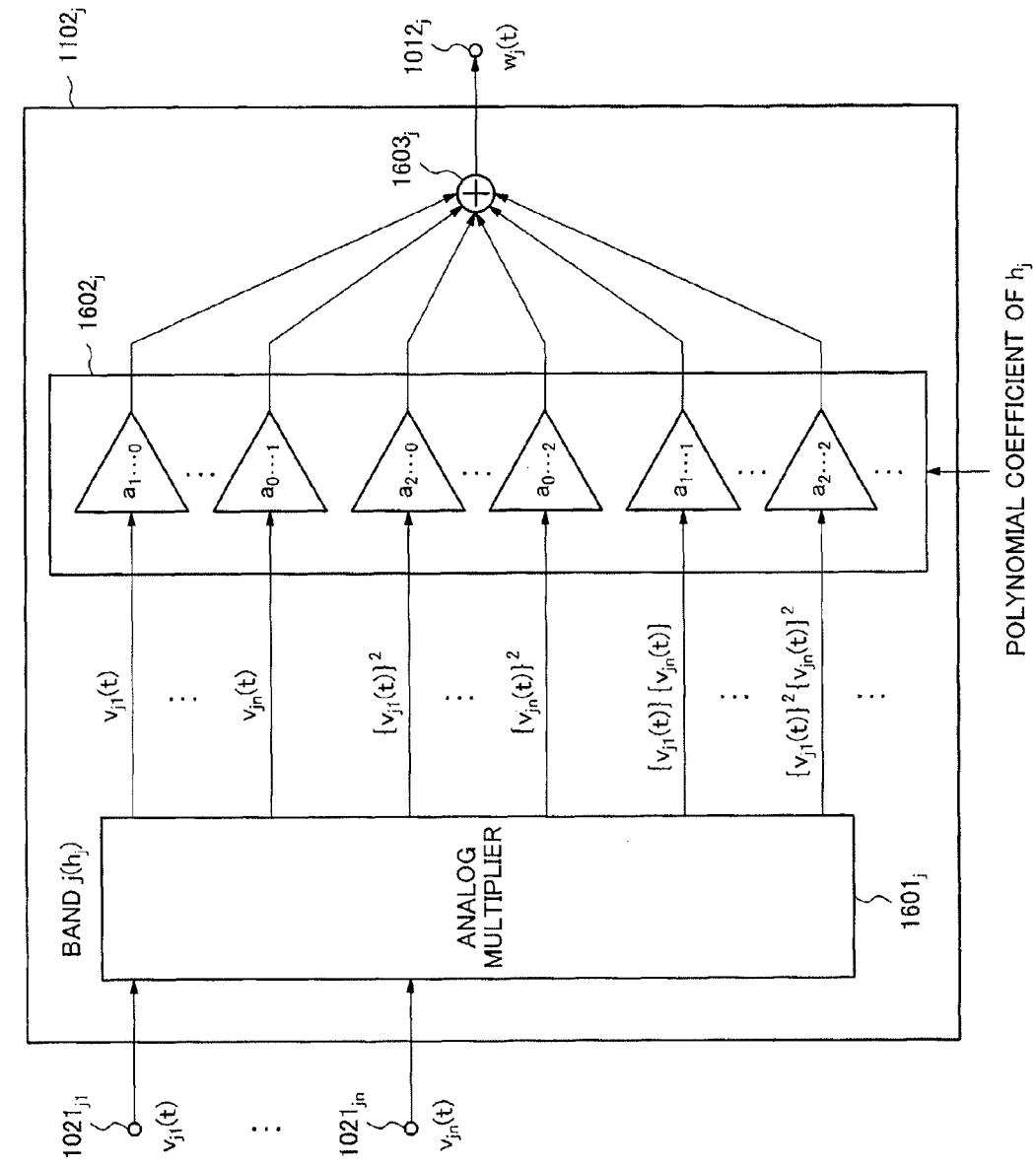
FIG. 8 is a block diagram illustrating another configuration of a distortion compensation control signal generating unit included in the radio transmitting device in accordance with the second exemplary embodiment of the present invention.

The distortion compensation control signal generating unit $1102_j$ corresponding to each band j (j=1, ..., n) included in the distortion compensation control signal generating unit 1102 can be implemented by using the analog circuit shown in FIG. 8 instead of digital circuits implemented by using a DSP or an FPGA. As shown in FIG. 8, the distortion compensation control signal generating unit $1102_j$ using analog circuits includes an analog multiplier $1601_j$, a variable gain amplifier sequence $1602_j$, and a baseband signal adder $1603_j$ at least.

Here, it is assumed that the distortion compensation function $h_j$ corresponding to the band j=1, . . . , n given by the above-mentioned formula (11) is developed by a polynomial shown by the following formula (14).

$$w_j(t) = h_j[v_{j1}(t), \ldots, v_{jn}(t)] = \sum_{k1,\ldots,kn} a_{k1\ldots kn}\{v_{j1}(t)\}^{k1} \ldots \{v_{jn}(t)\}^{kn}, \quad (14)$$

The circuit configuration of the distortion compensation control signal generating unit $1102j$ shown in FIG. 8 is designed so as to make the contents shown by formula (14) a circuit without change. That is to say, the distortion compensation control signal generating unit $1102j$ outputs the signal with $w_j(t)$ given by formula (14) to the terminal $1012_j$ with regard to signals $[v_{j1}(t), \ldots, v_{jn}(t)]$ inputted into terminals $1021_{j1}, \ldots, 1021_{jn}$.

The analog multiplier multiplies respective components of signals $[v_{j1}(t), \ldots, v_{jn}(t)]$ inputted into the terminals $1021_{j1}, \ldots, 1021_{jn}$ by each other, generates power signals $\{v_{j1}(t)\}^{k1} \ldots \{v_{jn}(t)\}^{kn}$ (k1, . . . , and kn represent natural number), and outputs them to the variable gain amplifier sequence $1602_j$. The variable gain amplifier sequence $1602_j$ amplifies each inputted power signal $\{v_{j1}(t)\}^{k1} \ldots \{v_{jn}(t)\}^{kn}$ with a gain corresponding to a coefficient $a_{k1 \ldots kn}$, and outputs to the baseband signal adder $1603_j$ a signal $a_{k1 \ldots kn}\{v_{j1}(t)\}^{k1} \ldots \{v_{jn}(t)\}^{kn}$ which is obtained by multiplying the power signal and the coefficient. The gain $a_{k1 \ldots kn}$ of the variable gain amplifier sequence $1602_j$ is variable and set on the basis of the information on the distortion compensation function $h_j$ outputted from the distortion characteristic calculating unit $1104$, that is, polynomial coefficients. All the signals $a_{k1 \ldots kn}\{v_{j1}(t)\}^{k1} \ldots \{v_{jn}(t)\}^{kn}$ (k1, . . . , and kn represent natural number) outputted from the variable gain amplifier sequence $1602_j$ are added in the baseband signal adder $1603_j$, and outputted to the terminal $1012_j$ as the signal $w_j(t)$. The baseband signal adder $1603_j$ can be configured by an analog circuit using an operational amplifier, for example.

The baseband signals inputted into the distortion compensation control signal generating unit $1102_j$ can be divided into in-phase components (in-phase signals) and quadrature components (quadrature signals). At this time, the distortion compensation control signal generating unit $1102_j$ includes two pieces of the configuration using analog circuits shown in FIG. 8, one of which is used for the in-phase component, the other of which is used for the quadrature component. In this case, the frequency converter $1203_j$ included in the multi-band RF signal generator $1002$ can be configured to have a quadrature modulator.

It is also acceptable to implement, using analog circuits, the transmitter delay correction unit $1101$, the distortion compensation control signal generating unit $1102$, and the whole path delay correction unit $1103$ which are included in the pre-distortion unit $1001$. In this case, the baseband signals $z(t)=[z_1(t), \ldots, z_n(t)]$ inputted into the terminals $1101_1, \ldots, 1011_n$ can be analog signals. The path from the terminals $1101_1, \ldots, 1011_n$ to the input terminal $1013$ of the power amplifier $1003$ is formed using analog circuits. Therefore, the digital-analog converters $1201_1, \ldots, 1201_n$ included in the multi-band RF signal generator $1002$ are made unnecessary, and consequently it is possible to reduce the number of parts.

(A Second Modification of the Second Exemplary Embodiment)

Figure 9:
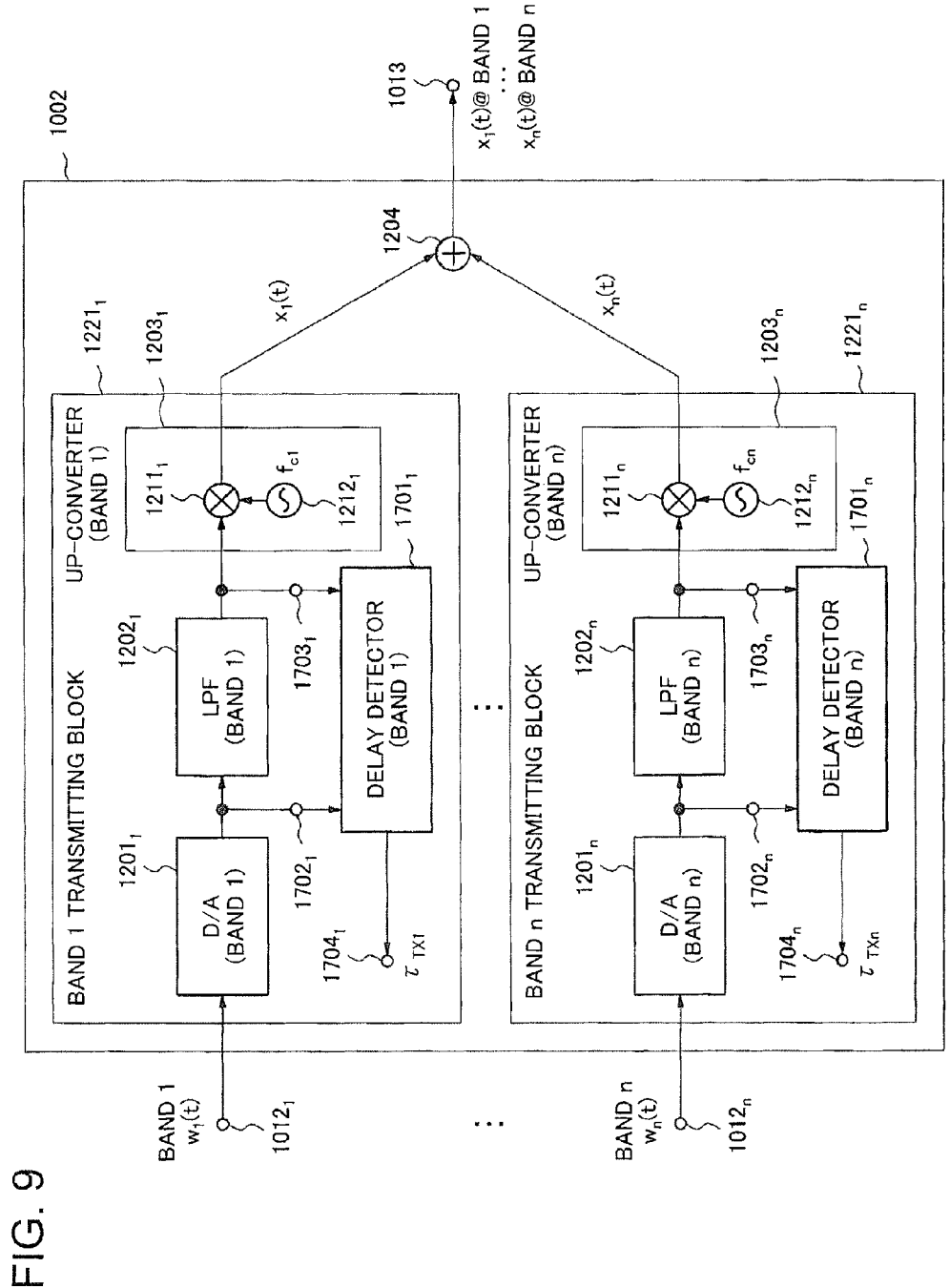
FIG. 9 is a block diagram illustrating another configuration of the multi-band RF signal generator included in the radio transmitting device in accordance with the second exemplary embodiment of the present invention.

The delay times $\tau_{TX1}, \ldots, \tau_{TXn}$ in the multi-band RF signal generator $1002$ shown in FIG. 5 are mainly caused by the low-pass filters $1202_1, \ldots, 1202_n$. Therefore, the delay times of the low-pass filters $1202_1, \ldots, 1202_n$ can be regarded as the delay times $\tau_{TX1}, \ldots, \tau_{TXn}$ in the multi-band RF signal generator $1002$. In this case, it is possible to adopt a configuration further including delay detectors $1701_1, \ldots, 1701_n$ used for detecting the delay times of the low-pass filters $1202_1, \ldots, 1202_n$ as a multi-band RF signal generator $1002$ shown in FIG. 9. Then delay times detected by the delay detectors $1701_1, \ldots, 1701_n$ can be considered to be the delay times $\tau_{TX1}, \ldots, \tau_{TXn}$ in the multi-band RF signal generator $1002$.

The delay detectors $1701_1, \ldots, 1701_n$ detect the delay times $\tau_{TX1}, \ldots, \tau_{TXn}$ of the low-pass filters on the basis of input signals and output signals of the low-pass filters $1202_1, \ldots, 1202_n$. Here, the input signals of the low-pass filters $1202_1, \ldots, 1202_n$ are inputted into the delay detectors $1701_1, \ldots, 1701_n$ through terminals $1702_1, \ldots, 1702_n$, and the output signals of the low-pass filters $1202_1, \ldots, 1202_n$ are inputted into the delay detectors $1701_1, \ldots, 1701_n$ through terminals $1703_1, \ldots, 1703_n$. The signals indicating the detected delay times $\tau_{TX1}, \ldots, \tau_{TXn}$ are sent to the transmitter delay correction unit $1101$ through terminals $1704_1, \ldots, 1704_n$, and used for setting the delay times in the variable delay means $1101_{kj}$ (k, j=1, . . . , n) included in the transmitter delay correction unit $1101$.

Figure 10:
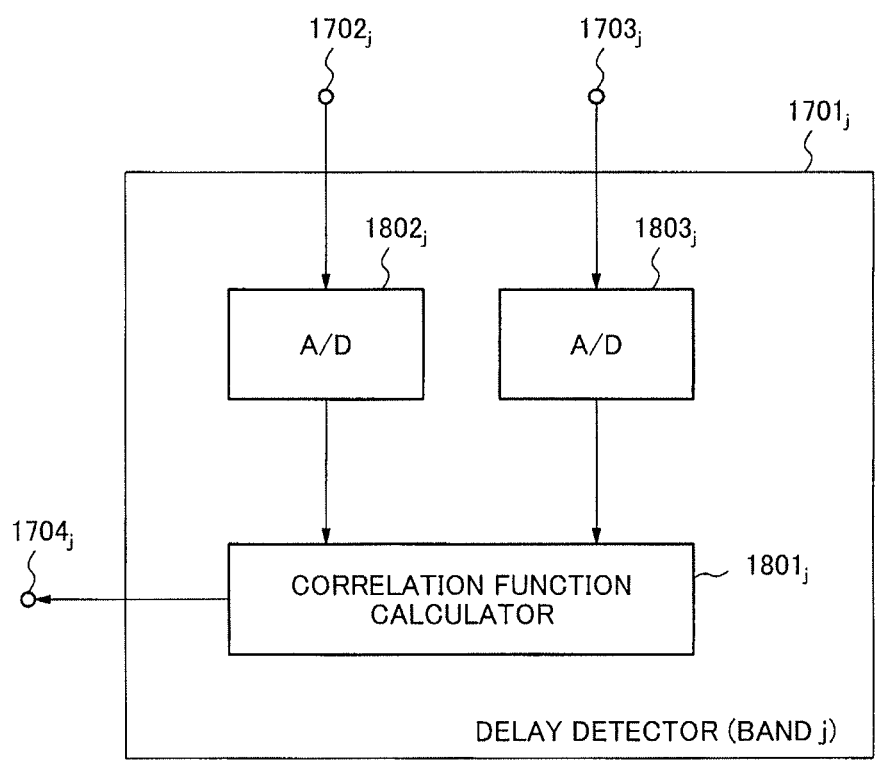
FIG. 10 is a block diagram illustrating a configuration of a delay detector included in the radio transmitting device in accordance with the second exemplary embodiment of the present invention.

FIG. 10 illustrates an example of the configuration of the delay detector $1701j$ corresponding to the band j. The delay detector $1701_j$ includes analog-digital converters $1802_j$ and $1803_j$, and a correlation function calculator $1801_j$ at least. The analog-digital converters $1802_j$ and $1803_j$ convert the input and output signals of the low-pass filter $1202_j$ inputted through the terminals $1702_j$ and $1703_j$ into digital signals, and output them to the correlation function calculator $1801_j$. The correlation function calculator $1801_j$ calculates a correlation function from the inputted input-output signals of the low-pass filter $1202_j$, and calculates the delay time $\tau_{TXj}$ of the low-pass filter $1202_j$ using the correlation function. The correlation function calculator $1801_j$ has a function of calculating a correlation function between two inputted signals, and can be configured by digital circuits implemented by using a DSP or an FPGA. In this case, it becomes possible to detect automatically the delay times $\tau_{TX1}, \ldots, \tau_{TXn}$ by means of the delay detectors $1701_1, \ldots, 1703_n$ integrated into the radio transmitting device $2000$ without using an external measuring equipment such as an oscilloscope.

A Third Exemplary Embodiment

Figure 11:
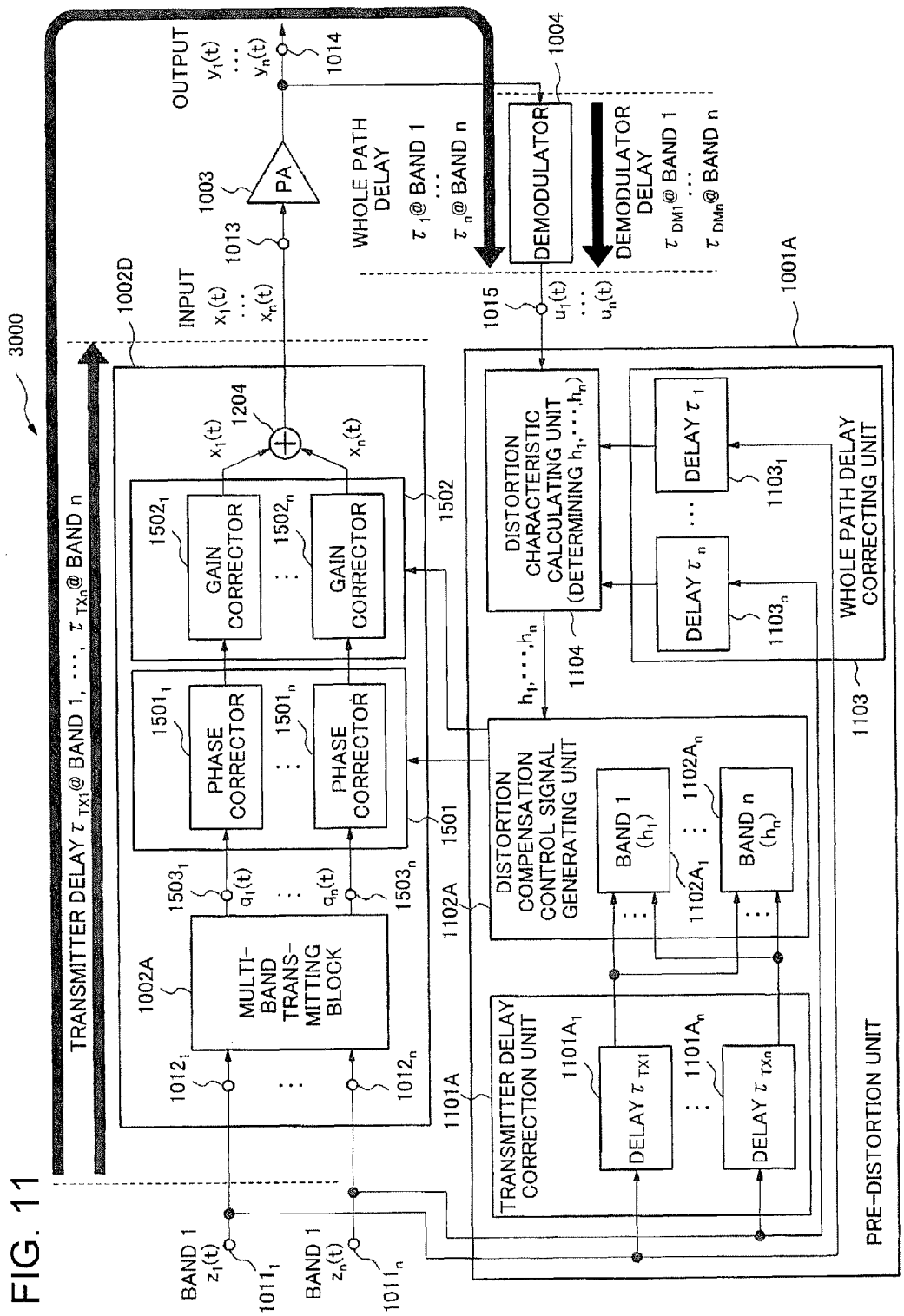
FIG. 11 is a block diagram illustrating a configuration of a radio transmitting device in accordance with a third exemplary embodiment of the present invention.

Next, a third exemplary embodiment will be described. FIG. 11 is a block diagram illustrating a configuration of a radio transmitting device $3000$ in accordance with the present exemplary embodiment. The radio transmitting device $3000$ includes a pre-distortion unit $1001A$, a multi-band RF signal generator $1002D$, the power amplifier $1003$, and the demodulator $1004$ at least.

The pre-distortion unit $1001A$ includes a transmitter delay correction unit $1101A$, a distortion compensation control signal generating unit $1102A$, the whole path delay correction unit $1103$, and the distortion characteristic calculating unit $1104$ at least. The multi-band RF signal generator $1002D$ includes a multi-band transmitting block $1002A$, an RF signal phase corrector $1501$, an RF signal gain corrector $1502$, and the RF signal combiner $1204$ at least.

The radio transmitting device $3000$ in accordance with the present exemplary embodiment simultaneously transmits RF signals in plural bands as is the case with the radio transmitting devices $1000$ and $2000$ according to the above-mentioned first and second exemplary embodiments. The radio transmitting device 3000 performs the distortion compensation of the RF output signals of the power amplifier 1003 during the transmission period on the basis of the non-linear characteristics of the power amplifier 1003 identified during the training period.

First, the operation of the radio transmitting device 3000 will be described below which is performed during the training period to identify the non-linear characteristics of the power amplifier 1003.

Into the radio transmitting device 3000, n pieces of baseband signals $z(t)=[z_1(t), \ldots, z_n(t)]$ are inputted through the terminals $1011_1, \ldots, 1011_n$. The represent components $z_1(t), \ldots, z_n(t)$ of the inputted baseband signal $z(t)$ are inputted into the multi-band transmitting block 1002A through the terminals $1012_1, \ldots, 1012_n$.

Figure 12:
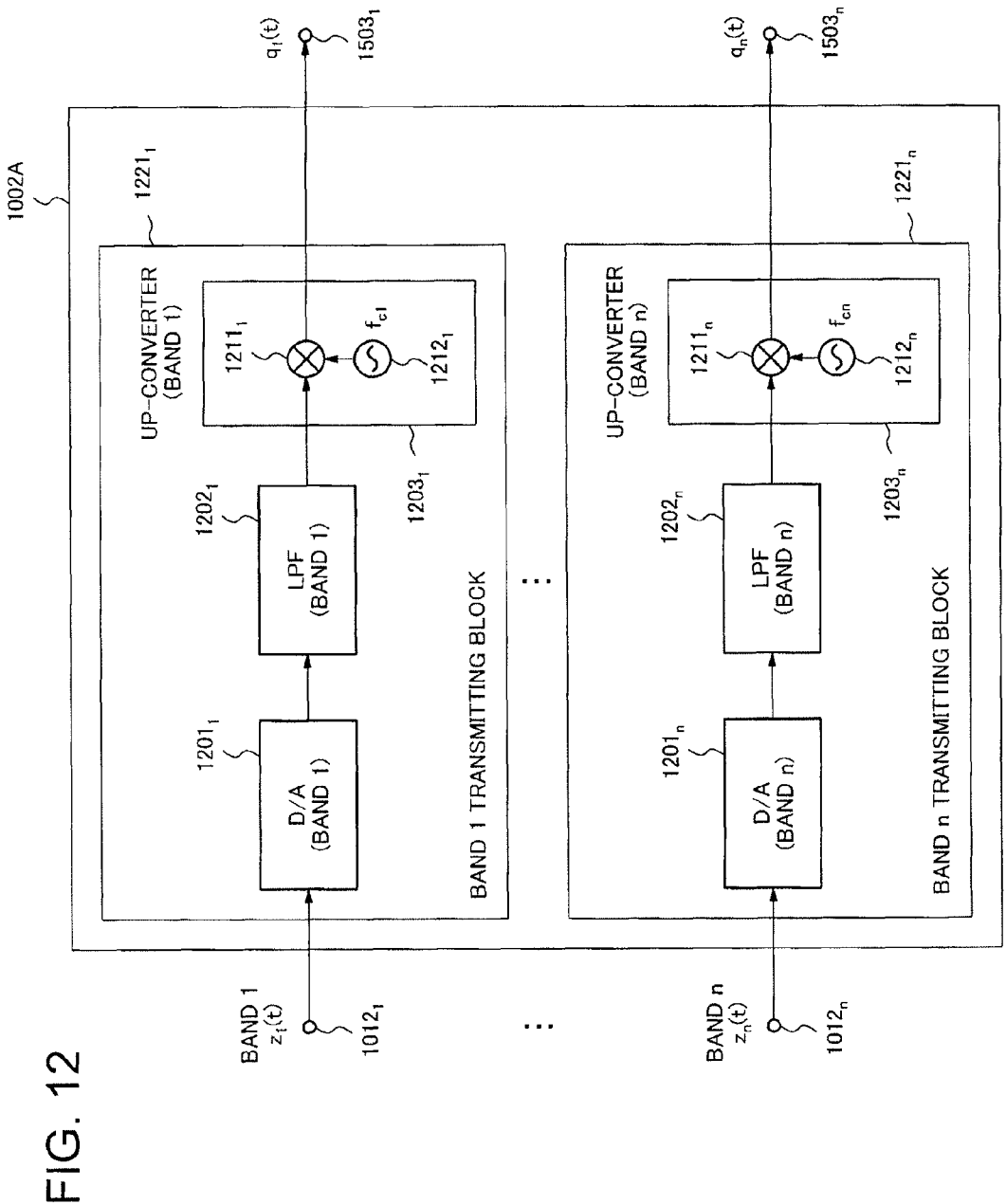
FIG. 12 is a block diagram illustrating a configuration of a multi-band transmitting block included in the radio transmitting device in accordance with the third exemplary embodiment of the present invention.

FIG. 12 illustrates an example of the configuration of the multi-band transmitting block 1002A. The multi-band transmitting block 1002A has the same configuration as that excluding the RF signal combiner 1204 from the configuration of the multi-band RF signal generator 1002 shown in FIG. 5. The multi-band transmitting block 1002A generates RF signals $q_1(t), \ldots, q_n(t)$ by frequency-converting each component $z_1(t), \ldots, z_n(t)$ of the baseband signals $z(t)$ inputted from the terminals $1012_1, \ldots, 1012_n$ into respective carrier frequencies of band $1, \ldots,$ band n. According to the present exemplary embodiment, the frequency-converted RF signals are outputted to respective terminals $1503_1, \ldots, 1503_n$ without combining them.

As shown in FIG. 11, the RF signals $q_1(t), \ldots, q_n(t)$ corresponding to band $1, \ldots,$ band n outputted from the multi-band transmitting block 1002A are inputted into the RF signal phase corrector 1501, respectively. The RF signal phase corrector 1501 includes n pieces of RF signal phase corrector $1501_1, \ldots, 1501_n$, which add the specified quantity of phase shift to the inputted RF signals $q_1(t), \ldots, q_n(t)$ on the band $1, \ldots,$ band n respectively, and output them. The phase shift is not added to the inputted RF signal during the training period, and the inputted RF signals are outputted to the RF signal gain corrector 1502 without change.

The RF signal gain corrector 1502 includes n pieces of RF signal gain corrector $1502_1, \ldots, 1502_n$, which add the specified quantity of gain variation to the inputted RF signals on the band $1, \ldots,$ band n respectively, and output them. The gain variation is not added to the inputted RF signal during the training period, and the inputted RF signals are outputted to the RF signal combiner 1204 without change.

The RF signal combiner 1204 combines the RF signals $x_1(t), \ldots, x_n(t)$ corresponding to band $1, \ldots,$ band j outputted from the RF signal gain corrector 1502, and simultaneously outputs them to the input terminal 1013 of the power amplifier 1003.

The respective band components $x_1(t), \ldots, x_n(t)$ of the RF signal $x(t)$ which are simultaneously inputted into the power amplifier 1003 are amplified and outputted to the terminal 1014 as the RF signals $y(t)=[y_1(t), \ldots, y_n(t)]$. The RF signal $y(t)$ is converted by the demodulator 1004 into the baseband signal $u(t)=[u_1(t), \ldots, u_n(t)]$ and then outputted to the terminal 1015. The baseband signal $u(t)$ is inputted into the pre-distortion unit 1001A.

The distortion characteristic calculating unit 1104 included in the pre-distortion unit 1001A calculates the functions $h_1, \ldots, h_n$ necessary for the distortion compensation by using the delayed baseband signals $z_d(t)=[z_1(t-\tau_1), \ldots, z_n(t-\tau_n)]$ and the baseband signals $u(t)=[u_1(t), \ldots, u_n(t)]$ outputted from the demodulator 1004. Here, the delayed baseband signals $z_d(t)=[z_1(t-\tau_1), \ldots, z_n(t-\tau_n)]$ are obtained from the terminals $1011_1, \ldots, 1011_n$ through the whole path delay correction unit 1103. The method for the distortion characteristic calculating unit 1104 to calculate the distortion compensation functions $h_1, \ldots, h_n$ in the present exemplary embodiment is the same as that in the second exemplary embodiment, and therefore its description is omitted. The transmitter delay correction unit 1101A and the distortion compensation control signal generating unit 1102A included in the pre-distortion unit 1001A can be put into a non-operating state (OFF state) during the training period for the radio transmitting device 3000.

Next, the operation will be described during the transmission period when the radio transmitting device 3000 according to the present exemplary embodiment transmits information signals.

The complex amplitudes $b_x(t)=[b_{x1}(t), \ldots, b_{xn}(t)]$ of the RF signals to be inputted into the power amplifier 1003 during the transmission period are given by formula (8) as shown in the first exemplary embodiment. When the RF signals with the complex amplitudes expressed by formula (8) are inputted into the power amplifier 1003, the effect of the non-linearity g of the power amplifier 10003 is removed from the complex amplitudes $b_y(t)$ of the RF signals outputted from the power amplifier 1003. As a result, the original baseband signals $z(t)$ inputted into the radio transmitting device 3000 are transmitted without distortion carried by the RF output signals of the power amplifier 1003.

The delay time $\tau_C$ is introduced in the first exemplary embodiment because of the condition that the delay time $\tau_{kj}$ in the variable delay means $1101_{kj}$ (k=1, ..., n) included in the transmitter delay correction unit 1101 is non-negative. In contrast, it is possible in the radio transmitting device 3000 according to the present exemplary embodiment that the delay time of the variable delay means $1101A_k$ (k=1, ..., n) included in the transmitter delay correction unit 1101A is made a non-negative value without introducing the delay time $\tau_C$. Accordingly, $\tau_C$ is set to be 0 in the present exemplary embodiment. As a result, the complex amplitudes $b_x(t)=[b_{x1}(t), \ldots, b_{xn}(t)]$ of the RF signals to be inputted into the power amplifier 1003 are given by the following formula (15) which is obtained by substituting the condition of $\tau_C=0$ into formula (8).

$$b_{x1}(t)=h_1[z_1(t-\tau_{TX1}), \ldots, z_n(t-\tau_{TXn})],$$

$$\ldots,$$

$$b_{xn}(t)=h_n[z_1(t-\tau_{TX1}), \ldots, z_n(t-\tau_{TXn})] \quad (15)$$

The reason will be described below why the complex amplitudes $b_x(t)=[b_{x1}(t), \ldots, b_{xn}(t)]$ the RF signals to be inputted into the power amplifier 1003 can be expressed by formula (15) as mentioned above. If the phase shift and the gain change are not added in the RF signal phase corrector 1501 and the RF signal phase corrector 1501, the complex amplitudes $b_x(t)=[b_{x1}(t), \ldots, b_{xn}(t)]$ of the RF signals to be inputted into the power amplifier 1003 are given by the following formula (16).

$$b_{x1}(t)=z_1(t-\tau_{TX1}),$$

$$\ldots,$$

$$b_{xn}(t)=zn(t-\tau_{TXn}) \quad (16)$$

Here, the amount of the gain change $\Delta G_1, \ldots, \Delta G_n$ in the respective RF signal gain correctors $1502_1, \ldots, 1502n$ and the amount of the phase change $\Delta\theta_1, \ldots, \Delta\theta_n$ in the respective RF signal phase correctors $1501_1, \ldots, 1501_n$ are set at the ratio of each component of the complex amplitudes $b_x(t)$ given by formula (15) and formula (16). That is to say, each amount of the gain change $\Delta G_1, \ldots, \Delta G_n$ is set as shown in the following formula (17).

$$\Delta G_1 = |h_1[z_1(t-\tau_{TX1}), \ldots, z_n(t-\tau_{TXn})]/z_1(t-\tau_{TX1})|,$$

$$\ldots,$$

$$\Delta G_n = |h_n[z_1(t-\tau_{TX1}), \ldots, z_n(t-\tau_{TXn})]/z_n(t-\tau_{TXn})| \quad (17)$$

Each amount of the phase shift $\Delta\theta_1, \ldots, \Delta\theta_n$ is set as shown in the following formula (18).

$$\Delta\theta_1 = \angle(h_1[z_1(t-\tau_{TX1}), \ldots, z_n(t-\tau_{TXn})]/z_1(t-\tau_{TX1})),$$

$$\ldots,$$

$$\Delta\theta_n = \angle(h_n[z_1(t-\tau_{TX1}), \ldots, {}_n(t-\tau_{TXn})]/z_n(t-\tau_{TXn})) \quad (18)$$

By setting the RF signal phase corrector 1501 and the RF signal gain corrector 1502 as mentioned above, it is possible to make the complex amplitudes $b_x(t)$ of the RF signals to be inputted into the power amplifier 1003 change from the state expressed by formula (16) to the state expressed by formula (15). That is to say, the complex amplitudes of the RF signals to be inputted into the power amplifier 1003 are set at the values expressed by formula (15), and therefore the linearization of the power amplifier 1003 has been achieved.

At this time, it is necessary to control dynamically the RF signal phase corrector 1501 and the RF signal gain corrector 1502 depending on the distortion compensation functions $h_1, \ldots, h_n$ and the signals $[z_1(t-\tau_{TX1}), \ldots, z_n(t-\tau_{TXn})]$ as shown in formula (17) and formula (18). The above-mentioned control will be described below.

The distortion compensation control signal generating unit 1102A stores the information on the distortion compensation functions $h_1, \ldots, h_n$ generated during the training period. The delay time by the variable delay means $1101A_k$ ($k=1, \ldots, n$) included in the transmitter delay correction unit 1101A is set at the same delay time $\tau_{TXk}$ ($k=1, \ldots, n$) as that in the multi-band transmitting block 1002A. As a result, the baseband signals $z(t) = [z_1(t), \ldots, z_n(t)]$ inputted from the terminals $1011_1, \ldots, 1011_n$ are delayed in the transmitter delay correction unit 1101A, and turned into signals $[z_1(t-\tau_{TX1}), \ldots, z_n(t-\tau_{TXn})]$, which are outputted to the distortion compensation control signal generating unit 1102A. The distortion compensation control signal generating unit 1102A obtains the signals $[z_1(t-\tau_{TX1}), \ldots, z_n(t-\tau_{TXn})]$ inputted from the transmitter delay correction unit 1101A and the information on the distortion compensation functions $h_1, \ldots, h_n$ generated during the training period. On the basis of the information, the distortion compensation control signal generating unit 1102A controls the RF signal phase corrector 1501 and the RF signal gain corrector 1502 so that the characteristics expressed by formula (17) and formula (18) may be obtained. The linearization of the power amplifier 1003 has been achieved by the above-mentioned control.

The variable delay means $1101A_1, \ldots, 1101A_n$ included in the transmitter delay correction unit 1101A can be implemented by using digital filters. The distortion compensation control signal generating unit 1102A is a digital circuit implemented by using a DSP or an FPGA. As mentioned above, the distortion compensation control signal generating unit 1102A outputs control signals for the RF signal phase corrector 1501 and the RF signal gain corrector 1502 on the basis of the baseband signals outputted from the transmitter delay correction unit 1101A and the functions $h_1, h_n$ according to formula (17) and formula (18).

Since the whole path delay correction unit 1103, the distortion characteristic calculating unit 1104, and the modulator 1004 included in the radio transmitting device 3000 are not used during the period without the training operation, it is acceptable to put these blocks into a non-operating state (OFF state).

Although the operation of the radio transmitting device 3000 according to the present exemplary embodiment has been described above separating the training period and the transmission period, it is also acceptable to perform the training operation during the transmission period. That is to say, it is also acceptable to determine the distortion compensation functions $h_1, \ldots, h_n$ by performing the training operation in the radio transmitting device 3000 simultaneously while communicating with another transmitting device using the RF output signals $y(t)$ from the power amplifier 1003.

As mentioned above, also in the case of the radio transmitting device 3000 according to the present exemplary embodiment, the transmitter delay correction unit 1101A appropriately synchronizes the signals among respective bands inputted into the power amplifier 1003. As a result, it is possible to transmit the baseband signal $z(t)$ without distortion carried by the RF output signal $y(t)$ of the power amplifier 1003 even if the power amplifier 1003 having non-linear input-output characteristics is used in the multiband concurrent transmission.

(A First Modification of the Third Exemplary Embodiment)

As is the case with the first modification of the second exemplary embodiment, also in the radio transmitting device 3000 according to the present exemplary embodiment, a part of the configuration of the pre-distortion unit 1001 can be implemented by using analog circuits. For example, the variable delay means $1101A_1, \ldots, 1101A_n$ included in the transmitter delay correction unit 1101A and the variable delay means $1103_1, \ldots, 1103_n$ included in the whole path delay correction unit 1103 can be implemented by using ananalog filters instead of digital filters.

The distortion compensation control signal generating unit $1102A_j$ corresponding to each band j ($j=1, \ldots, n$) included in the distortion compensation control signal generating unit 1102A can be implemented by using the analog circuit shown in FIG. 8 instead of digital circuits implemented by using a DSP or an FPGA.

(A Second Modification of the Third Exemplary Embodiment)

As is the case with the second modification of the second exemplary embodiment, also in the multi-band transmitting block 1002A shown in FIG. 12, it is possible to adopt a configuration further including delay detectors $1701_1, \ldots, 1701_n$ used for detecting the delay times of the low-pass filters $1202_1, \ldots, 1202_n$. In this case, delay times detected by the delay detectors $1701_1, \ldots, 1701_n$ can be considered to be the delay times $\tau_{TX1}, \ldots, \tau_{TX}$ in the multi-band RF signal generator 1002D. The signals indicating the detected delay times $\tau_{TX1}, \ldots, \tau_{TXn}$ are sent to the transmitter delay correction unit 1101A through the terminals $1704_1, \ldots, 1704_n$ shown in FIG. 9 and can be used for setting the delay times in the variable delay means $1101_{kj}$ (k, j=1, \ldots, n).

A Fourth Exemplary Embodiment

Figure 13:
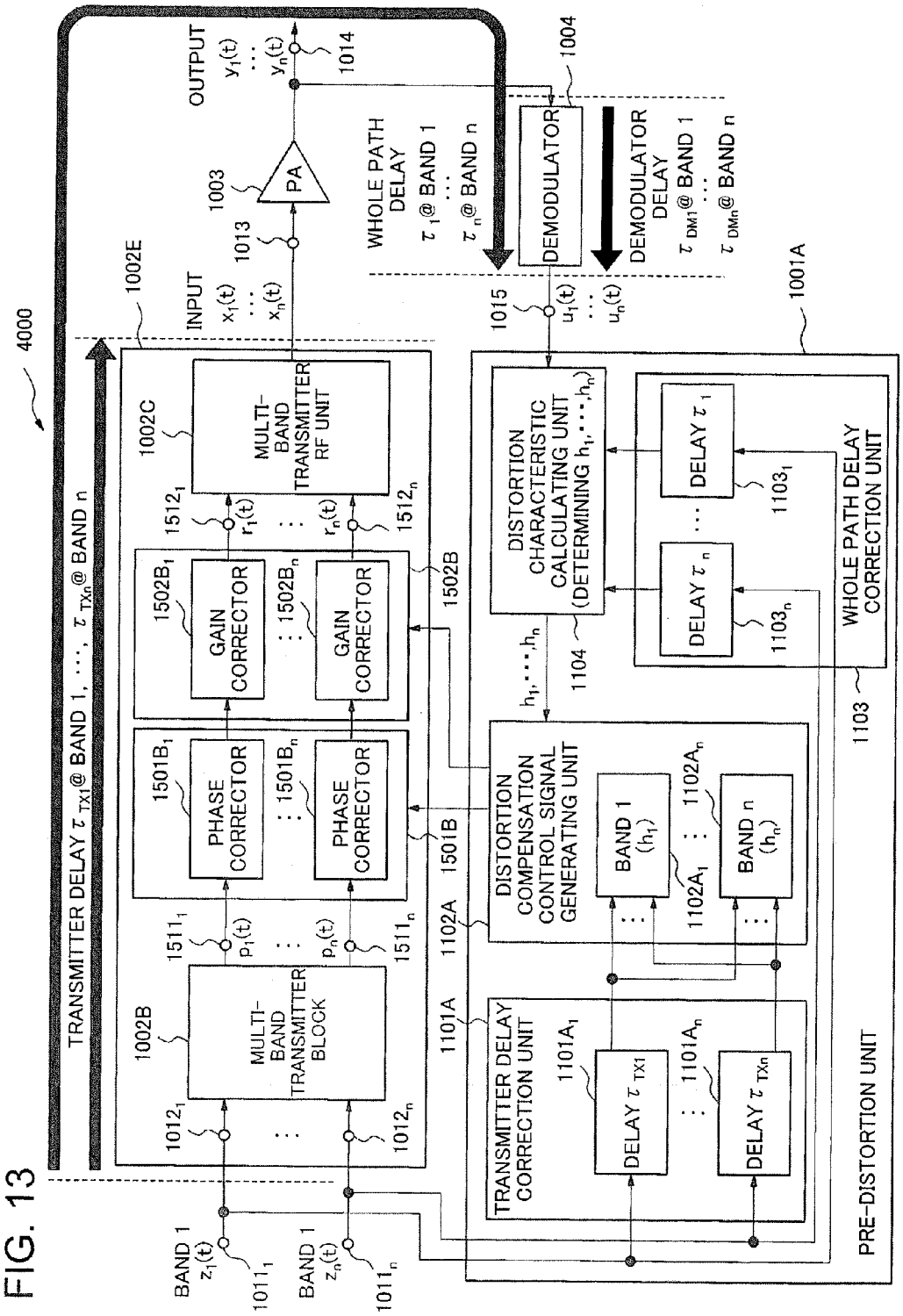
FIG. 13 is a block diagram illustrating a configuration of a radio transmitting device in accordance with a fourth exemplary embodiment of the present invention.

Next, a fourth exemplary embodiment of the present invention will be described. FIG. 13 is a block diagram illustrating a configuration of a radio transmitting device 4000 in accordance with the present exemplary embodiment. The radio transmitting device 4000 includes the pre-distortion unit 1001A, a multi-band RF signal generator 1002E, the power amplifier 1003, and the demodulator 1004 at least. The multiband RF signal generator 1002E includes a multi-band transmitter baseband unit 1002B, a baseband signal phase corrector 1501B, a baseband signal gain corrector 1502B, and a multi-band transmitter RF unit 1002C at least.

Figure 14:
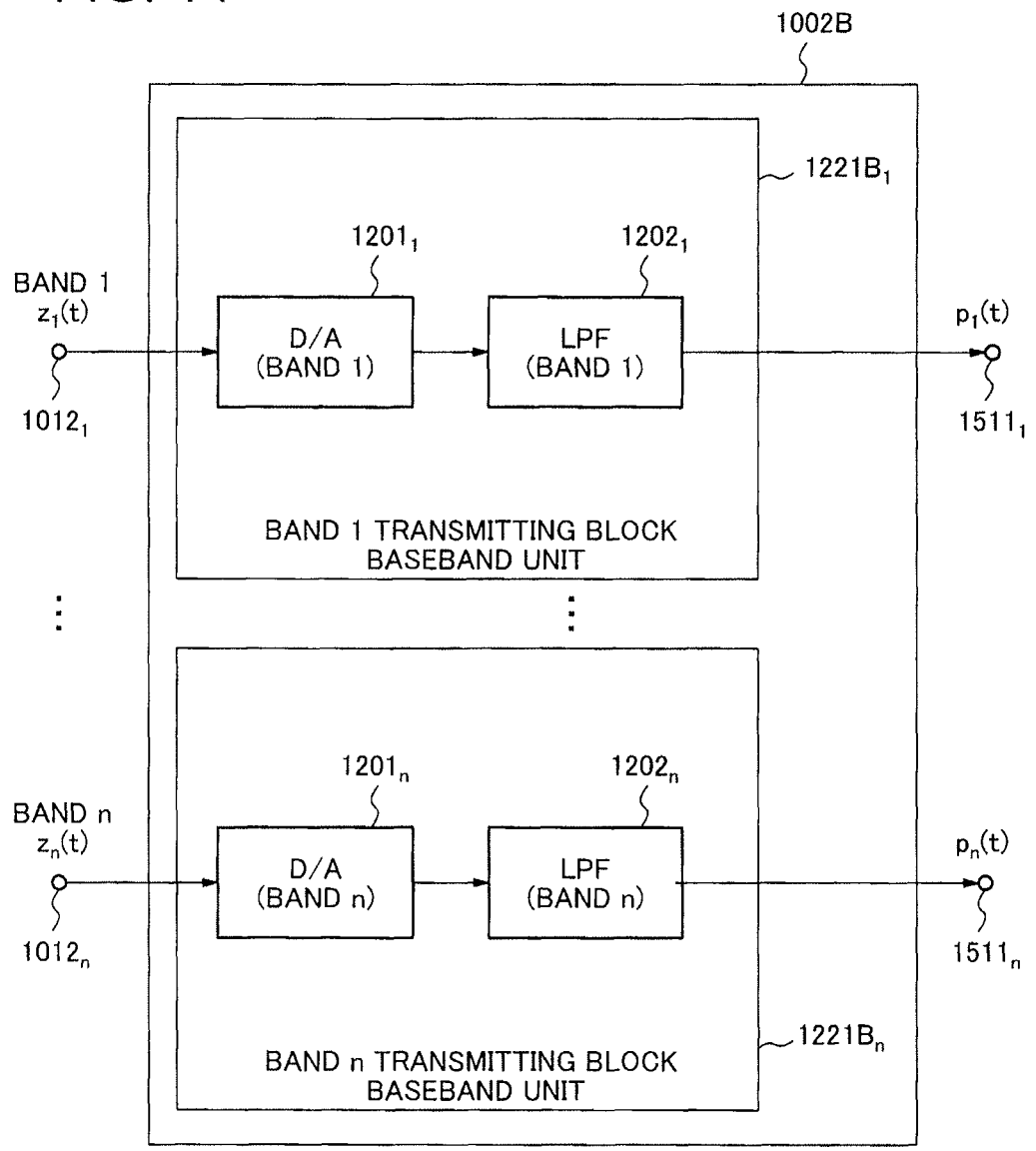
FIG. 14 is a block diagram illustrating a configuration of a multi-band transmitter baseband unit included in the radio transmitting device in accordance with the fourth exemplary embodiment of the present invention.

FIG. 14 illustrates an example of the configuration of the multi-band transmitter baseband unit 1002B. The multi-band transmitter baseband unit 1002B includes transmitting block baseband units $1221B_1, \ldots, 1221B_n$ for each band. The transmitting block baseband unit $1221B_j$ corresponding to each band j (j=1, . . . , n) includes a digital-analog converter $1201_j$ and a low-pass filter $1202_j$ at least. The respective components $z_1(t), \ldots, z_n(t)$ of the baseband signal z(t) are inputted into the terminals $1012_1, \ldots, 1012_n$ of the multi-band transmitter baseband unit 1002B. The digital baseband signal $z_j(t)$ corresponding to the band j inputted into the terminal $1012_j$ is converted into an analog baseband signal in the digital-analog converter $1201_j$, and then outputted to the low-pass filter $1202_j$. The low-pass filter $1202_j$ removes unwanted high-frequency components from the inputted analog baseband signal and outputs it to a terminal $1511_j$ as an analog baseband signal $p_j(t)$.

As shown in FIG. 13, the analog baseband signals $p_1(t), \ldots, p_n(t)$ corresponding to band 1, . . . , band j outputted from the multi-band transmitter baseband unit 1002B are inputted into the baseband signal phase corrector 1501B respectively. The baseband signal phase corrector 1501B includes n pieces of baseband signal phase corrector $1501B_1, \ldots, 1501B_n$, which add the specified quantity of phase shift to the inputted analog baseband signals $p_1(t), \ldots, p_n(t)$ on the band 1, . . . , band n respectively, and output them. The baseband signal gain corrector 1502B includes n pieces of baseband signal gain corrector $1502B_1, \ldots, 1502B_n$, which add the specified quantity of gain variation to the inputted analog baseband signals on the band 1, . . . , band n respectively, and output them to terminals $1512_1, \ldots, 1512_n$ as analog baseband signals $r_1(t), \ldots, r_n(t)$.

Figure 15:
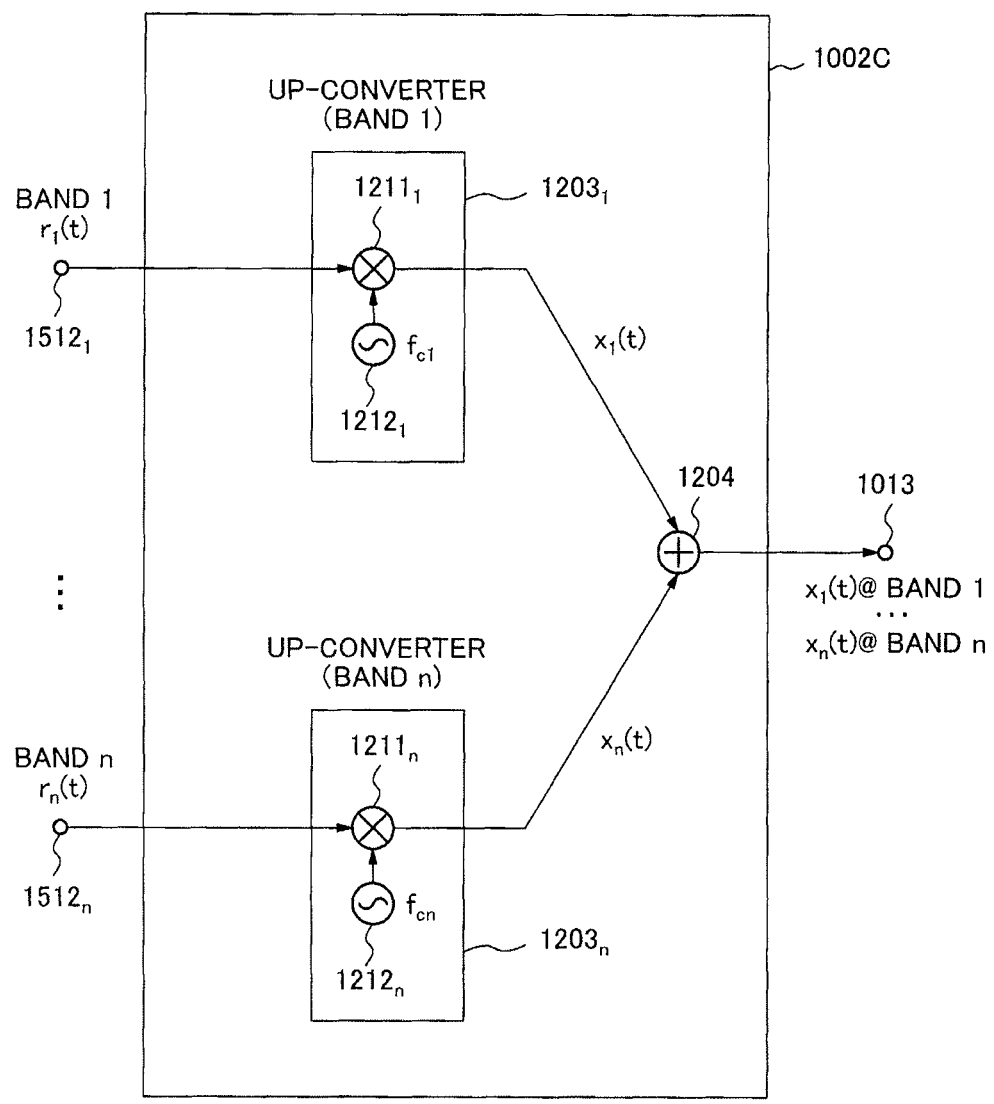
FIG. 15 is a block diagram illustrating a configuration of a multi-band transmitter RF unit included in the radio transmitting device in accordance with the fourth exemplary embodiment of the present invention.

FIG. 15 illustrates an example of the configuration of the multi-band transmitter RF unit 1002C. The multi-band transmitter RF unit 1002C includes frequency converters $1203_1, \ldots, 1203_n$ corresponding to respective bands and an RF signal combiner 1204 at least. Here, the frequency converter $1203_j$, includes an LO signal generator $1212_j$ and a mixer $1211_j$. The LO signal generator $1212_j$ outputs the LO signal with the carrier frequency $f_{cj}$ corresponding to the band j. The mixer $1211_j$ generates the RF signal $x_j(t)$ by mixing the inputted analog baseband signal $r_j(t)$ and the LO signal, and outputs it. The RF signals $x_1(t), \ldots, x_n(t)$ outputted respectively from the frequency converters $1203_1, \ldots, 1203_n$ for each band are combined in the RF signal combiner 1204 and simultaneously outputted to the terminal 1013.

As shown in FIG. 11, in the radio transmitting device 3000 in accordance with the third exemplary embodiment, the RF signal phase corrector 1501 and the RF signal gain corrector 1502 are configured to correct the phase and the gain of the RF signal. In contrast, in the radio transmitting device 4000 in accordance with the present exemplary embodiment, as shown in FIG. 13, the baseband signal phase corrector 1501B and the baseband signal gain corrector 1502B are configured to correct the phase and the gain of the baseband signal. That is to say, the difference between the radio transmitting device 4000 according to the present exemplary embodiment (FIG. 13) and the radio transmitting device 3000 according to the third exemplary embodiment (FIG. 11) is a fact only that signals whose gain and phase are corrected are RF signals or baseband signals. The other configurations are common to both radio transmitting devices.

That is to say, the radio transmitting device 4000 in accordance with the present exemplary embodiment simultaneously transmits RF signals in plural bands and performs the distortion compensation of the RF output signals of the power amplifier 1003 during the transmission period on the basis of the non-linear characteristics of the power amplifier 1003 identified during the training period.

The radio transmitting device 4000 measures the input-output characteristics of the power amplifier 1003 during the training period and calculates the distortion compensating functions $h_1, \ldots, h_n$ by the same procedure as that of the radio transmitting device 3000 according to the third exemplary embodiment. The operation of the radio transmitting device 4000 during the transmission period is the same as that of the radio transmitting device 3000 according to the third exemplary embodiment. That is to say, the baseband signal phase corrector 1501B and the baseband signal gain corrector 1502B add the phase correction amount and the gain correction amount given by formula (18) and formula (17) to the inputted baseband signals $p_1(t), \ldots, p_n(t)$.

As is the case with the above-mentioned exemplary embodiments, also in the radio transmitting device 3000, the transmitter delay correction unit 1101A appropriately synchronizes the signals among respective bands inputted into the power amplifier 1003. As a result, it is possible to transmit the baseband signal z(t) without distortion carried by the RF output signal y(t) of the power amplifier 1003 even if the power amplifier 1003 having non-linear input-output characteristics is used in the multiband concurrent transmission.

(A First Modification of the Fourth Exemplary Embodiment)

As is the case with the first modification of the third exemplary embodiment, also in the radio transmitting device 4000 according to the present exemplary embodiment, a part of the configuration of the pre-distortion unit 1001A can be implemented by using analog circuits.

(A Second Modification of the Fourth Exemplary Embodiment)

As is the case with the second modification of the second exemplary embodiment, it is also acceptable to adopt a configuration further including delay detectors $1701_1, \ldots, 1701_n$ used for detecting the delay times of the low-pass filters $1202_1, \ldots, 1202_n$ in the multi-band transmitter baseband unit 1002B according to the present exemplary embodiment shown in FIG. 14. In this case, delay times detected by the delay detectors $1701_1, \ldots, 1701_n$ can be considered to be the delay times $\tau_{TX1}, \ldots, \tau_{TXn}$ in the multi-band RF signal generator 1002E. The signals indicating the detected delay times $\tau_{TX1}, \ldots, \tau_{TXn}$ are sent to the transmitter delay correction unit 1101A through terminals $1704_1, \ldots, 1704_n$ and used for setting the delay times in the variable delay means $1101_{kj}$ (k, j=1, . . . , n).

The radio transmitting devices according to the above-mentioned exemplary embodiments have the following advantages in comparison with the related radio transmitting device described in Patent Literature 2 which is referred to as the background art.

In the related radio transmitting device described in Patent Literature 1, there has been a problem that it is impossible to avoid an increase in the distortion of the RF signal outputted from the power amplifier due to the synchronous deviation between the RF input signals in two bands even if the compensation for distortion is performed by the pre-distortion.

In contrast, the radio transmitting device according to each of the above-mentioned exemplary embodiments includes the transmitter delay correction unit. Therefore, it becomes possible to correct the synchronous deviation between the input signals of the power amplifier in the respective bands due to the delay time in the path from the distortion compensation control signal generating unit to the input terminal of the power amplifier. As a result, it is possible to solve the problem that the distortion deterioration due to the synchronous deviation and obtain the effect that signals can be transmitted without distortion even if the power amplifier having the non-linear input-output characteristics is used.

The present invention is not limited to the aforementioned exemplary embodiments. Various modifications can be made therein within the scope of the present invention as defined by the claims, and obviously, such modifications are included in the scope of the present invention.

The whole or part of the exemplary embodiments disclosed above can be described as, but not limited to, the following supplementary notes.

(Supplementary Note 1)

A radio transmitting device, comprising:

a multi-band RF signal generating means for making each of a plurality of input baseband signals carried by a carrier wave with each of different frequencies, and outputting the carrier wave as a radio frequency signal;

a power amplifying means for amplifying and outputting the radio frequency signal;

a distortion compensation control signal generating means for applying a distortion compensating function, which compensates a distortion characteristic of the power amplifying means, to the each of the plurality of input baseband signals; and a transmitter delay correction means for correcting a difference in delays which the plurality of input baseband signals receive respectively in the multi-band RF signal generating means.

(Supplementary Note 2)

The radio transmitting device according to Supplementary note 1, further comprising a demodulation means, a whole path delay correction means, and a distortion characteristic calculating means, wherein the demodulation means converts the radio frequency signal outputted from the power amplifying means into an output baseband signal with respect to each carrier frequency band;

the whole path delay correction means adds a correction of a delay time with respect to each of the plurality of input baseband signals corresponding to a whole path delay time for each frequency band of the carrier wave on a path from an output of the distortion compensation control signal generating means to an output of the demodulation means;

the distortion characteristic calculating means calculates the distortion compensation function for each frequency band of the carrier wave on the basis of the plurality of input baseband signals given a correction of a delay time outputted from the whole path delay correction means and a plurality of the output baseband signals outputted from the demodulation means, and passes the distortion compensation function to the distortion compensation control signal generating means; and additionally the distortion characteristic calculating means calculates a correlation function between the input baseband signal and the output baseband signal, calculates the whole path delay time on the basis of the correlation function, and determines a correction amount of a delay time added in the whole path delay correction means on the basis of the calculated whole path delay time.

(Supplementary Note 3)

The radio transmitting device according to Supplementary note 1 or 2, wherein the transmitter delay correction means makes input baseband signals carried by a single carrier wave branch into a plurality of parts corresponding to the number of the different frequencies, and adds a delay time to each of the divided input baseband signals; and the delay time is a difference between a delay which input baseband signals carried by one carrier wave suffer in the multi-band RF signal generating means and a delay which input baseband signals carried by the other carrier wave suffer in the multi-band RF signal generating means.

(Supplementary Note 4)

The radio transmitting device according to any one of Supplementary notes 1, 2, and 3, wherein the multi-band RF signal generating means includes a plurality of low-pass filters, a plurality of frequency converting means, and a RF signal combining means at least, wherein the low-pass filter removes a high frequency component of a baseband signal inputted from the distortion compensation control signal generating means;

the frequency converting means makes the baseband signal outputted from the low-pass filter carried by a radio frequency signal in a frequency band of a carrier wave and outputs the radio frequency signal; and the RF signal combining means combines respective radio frequency signals in the frequency bands of the carrier wave outputted from the plurality of frequency converting means and outputs the radio frequency signals.

(Supplementary Note 5)

The radio transmitting device according to Supplementary note 1 or 2, wherein the multi-band RF signal generating means includes at least a plurality of low-pass filters removing a high frequency component of the plurality of input baseband signals;

a plurality of frequency converting means for making the plurality of input baseband signals outputted from the low-pass filters carried by respective radio frequency signals in frequency bands of the carrier wave and outputting the radio frequency signals;

a plurality of RF signal phase correcting means for correcting a phase of the radio frequency signal outputted from the frequency converting means;

a plurality of RF signal gain correcting means for correcting a gain of the radio frequency signal outputted from the frequency converting means; and an RF signal combining means for combining the radio frequency signals whose gains and phases are corrected in the RF signal gain correcting means and the RF signal phase correcting means and outputting the radio frequency signals;

wherein the distortion compensation control signal generating means generates corrected baseband signals by applying distortion compensating functions to compensate a distortion characteristic of the power amplifying means to the plurality of input baseband signals, and controls a gain correction amount in the RF signal gain correcting means and a phase correction amount in the RF signal phase correcting means so that a radio frequency signal in a frequency band of a carrier wave carrying the corrected baseband signals may be outputted from the multi-band RF signal generating means.

(Supplementary Note 6)

The radio transmitting device according to Supplementary note 1 or 2, wherein the multi-band RF signal generating means includes at least a plurality of low-pass filters removing a high frequency component of the plurality of input baseband signals;

a plurality of baseband signal phase correcting means for correcting each phase of the plurality of input baseband signals outputted from the low-pass filters;

a plurality of baseband signal gain correcting means for correcting each gain of the plurality of input baseband signals outputted from the low-pass filters;

a plurality of frequency converting means for making the plurality of input baseband signals outputted from the baseband signal phase correcting means and the baseband signal gain correcting means carried by respective radio frequency signals in frequency bands of the carrier wave and to outputting the radio frequency signals; and an RF signal combining means for combining the radio frequency signals outputted from the frequency converting means and outputting the radio frequency signals;

wherein the distortion compensation control signal generating means generates corrected baseband signals by applying distortion compensating functions to compensate a distortion characteristic of the power amplifying means to the plurality of input baseband signals, and controls a gain correction amount in the baseband signal gain correcting mean and a phase correction amount in the baseband signal phase correcting means so that a radio frequency signal in a frequency band of a carrier wave carrying the corrected baseband signals may be outputted from the multi-band RF signal generating means.

(Supplementary Note 7)

The radio transmitting device according to any one of Supplementary notes 4, 5, and 6, wherein the multi-band RF signal generating means further includes a delay detecting means for detecting a delay time of the low-pass filter;

the delay detecting means sends the detected delay time of the low-pass filter to the transmitter delay correction means; and the transmitter delay correction means corrects the delay time of the low-pass filter as a difference in delays which the plurality of input baseband signals receive respectively in the multi-band RF signal generating means.

(Supplementary Note 8)

A radio transmitting method, comprising:

correcting a difference in delays which a plurality of input baseband signals receive respectively in generating a radio frequency signal obtained by making each of the plurality of input baseband signals carried by a carrier wave with each of different frequencies; and applying a distortion compensating function for compensating a distortion characteristic in amplifying the radio frequency signal to the plurality of baseband signals with the difference in delays corrected.

(Supplementary Note 9)

The radio transmitting method according to Supplementary note 8, further comprising:

converting the amplified radio frequency signal into an output baseband signal with respect to each carrier frequency band;

calculating a correlation function between the input baseband signal and the output baseband signal;

calculating on the basis of the correlation function a whole path delay time of a delay time which the input baseband signal receives from when the distortion compensating function is applied till when the input baseband signal is converted into the output baseband signal;

correcting a difference in a delay time with respect to each of the plurality of input baseband signals on the basis of the whole path delay time; and calculating the distortion compensation function for each frequency band of the carrier wave on the basis of the input baseband signal given a correction of the difference in the delay time and the output baseband signal.

(Supplementary Note 10)

The radio transmitting method according to Supplementary note 8 or 9, wherein in correcting the difference in the delay time, input baseband signals carried by a single carrier wave are made to branch into a plurality of parts corresponding to the number of the different frequencies, a delay time is added to each of the divided input baseband signals; and the delay time is a difference between a delay which input baseband signals carried by one carrier wave suffer in the amplifying and a delay which input baseband signals carried by the other carrier wave suffer in the amplifying.

(Supplementary Note 11)

The radio transmitting device according to Supplementary note 2, wherein the demodulator includes, at least:

A variable band-pass filter whose pass-band can be changed and which makes only a radio frequency signal existing in a frequency band of a designated carrier pass;

a variable frequency converter to convert the radio frequency signal, which exists in the frequency band of the designated carrier; into an analog baseband signal;

a variable low-pass filter whose cut-off frequency can be changed and which can remove a high frequency from the analog baseband signal outputted by the variable frequency converter; and an analog-digital converter which converts the analog baseband signal outputted by the variable low-pass filter into a digital baseband signal, wherein only the radio frequency signal existing in the frequency band of the designated carrier out of the radio frequency signals, which exist in the frequency bands of the plural carriers and which are outputted by the power amplifier, is converted into a baseband signal, and the baseband signal is inputted into the distortion characteristic calculating unit, and by converting radio frequency signals, which exist in frequency bands of different carriers in place of the frequency band of the designated carrier, into baseband signals, baseband signals corresponding to frequency bands of plural carriers are inputted into the distortion characteristic calculating unit (Supplementary Note 12)

The radio transmitting device according to Supplementary note 2, wherein the demodulator includes, at least:

a plurality of band-pass filters each of which makes only a radio frequency signal existing in a frequency band of each carrier, pass;

a plurality of frequency converters each of which converts a radio frequency signal, which exists in the frequency band of each carrier, into an analog signal;

a plurality of low-pass filters each of which removes a high frequency from the analog baseband signal outputted by the frequency converter corresponding to the frequency band of each carrier; and an analog-digital converter to convert the analog baseband signal, which is outputted by the low-pass filter corresponding to the frequency band of each carrier, into a digital signal, wherein radio frequency signals which exist in frequency bands of plural carriers and which are outputted by the power amplifier are converted into baseband signals corresponding to the frequency bands of the carriers, and the baseband signals are inputted into the distortion characteristic calculating unit.
(Supplementary Note 13)
The radio transmitting device according to Supplementary note 7,
wherein the delay detector includes, at least:
an analog-digital converter which converts the input signal and the output signal of the low-pass filter into digital signals respectively; and
a correlation function calculator which calculates a correlation function between the input signal and the output signal of the low-pass filter, wherein
the correlation function calculator calculates a delay time of the low-pass filter on the basis of the correlation function.
(Supplementary Note 14)
The radio transmitting method according to any one of Supplementary notes 8, 9, and 10, comprising:
when generating the radio frequency signal,
removing a high frequency component of an input baseband signal to which correction of the difference in the delay time is carried out;
making a radio frequency signal, which exists in a frequency band of a carrier, carry the baseband signal from which the high frequency component is removed; and
combining radio frequency signals which exist in the frequency bands of the plural carriers, and outputting the combination of the radio frequency signals.
(Supplementary Note 15)
The radio transmitting method according to Supplementary note 8 or 9, comprising:
removing a high frequency component of each of the plural input baseband signals when generating the radio frequency signal;
making radio frequency signals, which exist in frequency bands of carriers, carry the plural input baseband signals from each of which the high frequency component is removed, and outputting the radio frequency signal carrying the input baseband signal;
correcting a phase of the radio frequency signal;
correcting a gain of the radio frequency signal;
combining the radio frequency signals to which correction of the gain and the phase is carried out, and outputting the combination of the radio frequency signals;
generating corrected baseband signals by applying the distortion compensating functions to the plural input baseband signals; and
controlling an amount of the gain correction and an amount of the phase correction so as to output a radio frequency signal which exists in a frequency band of a carrier carrying the corrected baseband signal.
(Supplementary Note 16)
The radio transmitting method according to Supplementary note 8 or 9, comprising:
removing a high frequency component of each of the plural input baseband signals when generating the radio frequency signal;
correcting a phase of each of the plural input baseband signals from each of which the high frequency component is removed;
correcting a gain of each of the plural input baseband signals from each of which the high frequency component is removed
making radio frequency signals, which exist in frequency bands of carriers, carry the plural input baseband signals to which correction of the gain and the phase is carried out, and outputting the radio frequency signals carrying the input baseband signals;

combining a plurality of radio frequency signals carrying the plural input baseband signals to which correction of the gain and the phase is carried out, and outputting the combination of the plural radio frequency signals carrying the plural input baseband signals;
generating corrected baseband signals by applying the distortion compensating functions to the plural input baseband signals to which correction of the gain and the phase is carried out; and
controlling an amount of the gain correction and an amount of the phase correction so as to output a radio frequency signal which exists in a frequency band of a carrier carrying the corrected baseband signal.

This application is based upon and claims the benefit of priority from Japanese Patent Application No. 2013-045559, filed on Mar. 7, 2013, the disclosure of which is incorporated herein in its entirety by reference.

REFERENCE SIGNS LIST 1000, 2000, 3000, 4000 radio transmitting device
1001, 1001A pre-distortion unit
1002, 1002D, 1002E multi-band RF signal generator
1002A multi-band transmitting block
1002B multi-band transmitter baseband unit
1002C multi-band transmitter RF unit
1003 power amplifier
1004 demodulator
1011, 1012, 1013, 1014, 1015, 1021, 1503, 1511, 1702, 1703, 1704 terminal
1101, 1101A transmitter delay correction unit
1101$kj$, 1103$j$ variable delay means
1102, 1102A distortion compensation control signal generating unit
1103 whole path delay correction unit
1104 distortion characteristic calculating unit
1201 digital-analog converter
1202 low-pass filter
1203 frequency converter
1204 RF signal combiner
1211 mixer
1212 local oscillation (LO) signal generator
1221 transmitting block
1221B transmitting block baseband unit
1301 variable band-pass filter
1302 variable frequency converter
1303 variable low-pass filter
1304, 1802, 1803 analog-digital converter
1311 mixer
1312 frequency variable LO signal generator
1321 demodulation block
1501 RF signal phase corrector
1501B baseband signal phase corrector
1502 RF signal gain corrector
1502B baseband signal gain corrector
1601 analog multiplier
1602 variable gain amplifier sequence
1603 baseband signal adder
1701 delay detector
1801 correlation function calculator
100, 200 related radio transmitting device
110A, 110B input baseband signal
115A, 115B baseband signal
120 pre-distortion unit
125A, 125B pre-distorter
130 dual-band transmitter
135A, 135B low-pass filter 140A, 140B local oscillation (LO) signal generator
145A, 145B mixer
150 power combiner
160 power amplifier
170 RF signal

The invention claimed is:

1. A radio transmitting device, comprising:
a multi-band RF signal generator making each of a plurality of input baseband signals carried by a carrier wave with each of different frequencies, and outputting the carrier wave as a radio frequency signal;
a power amplifier amplifying and outputting the radio frequency signal;
a distortion compensation control signal generating unit applying a distortion compensating function, which compensates a distortion characteristic of the power amplifier, to the each of the plurality of input baseband signals; and
a transmitter delay correction unit correcting a difference in delays which the plurality of input baseband signals receive respectively in the multi-band RF signal generator.

2. The radio transmitting device according to claim 1, further comprising a demodulator, a whole path delay correction unit, and a distortion characteristic calculating unit,
wherein the demodulator converts the radio frequency signal outputted from the power amplifier into an output baseband signal with respect to each carrier frequency band;
the whole path delay correction unit adds a correction of a delay time with respect to each of the plurality of input baseband signals corresponding to a whole path delay time for each frequency band of the carrier wave on a path from an output of the distortion compensation control signal generating unit to an output of the demodulator;
the distortion characteristic calculating unit calculates the distortion compensation function for each frequency band of the carrier wave on the basis of the plurality of input baseband signals given a correction of a delay time outputted from the whole path delay correction unit and a plurality of the output baseband signals outputted from the demodulator, and passes the distortion compensation function to the distortion compensation control signal generating unit; and additionally
the distortion characteristic calculating unit calculates a correlation function between the input baseband signal and the output baseband signal, calculates the whole path delay time on the basis of the correlation function, and determines a correction amount of a delay time added in the whole path delay correction unit on the basis of the calculated whole path delay time.

3. The radio transmitting device according to claim 2,
wherein the transmitter delay correction unit makes input baseband signals carried by a single carrier wave branch into a plurality of parts corresponding to the number of the different frequencies, and adds a delay time to each of the divided input baseband signals; and
the delay time is a difference between a delay which input baseband signals carried by one carrier wave suffer in the multi-band RF signal generator and a delay which input baseband signals carried by the other carrier wave suffer in the multi-band RF signal generator.

4. The radio transmitting device according to claim 2,
wherein the multi-band RF signal generator includes a plurality of low-pass filters, a plurality of frequency converter, and a RF signal combiner at least,
wherein the low-pass filter removes a high frequency component of a baseband signal inputted from the distortion compensation control signal generating unit;
the frequency converter makes the baseband signal outputted from the low-pass filter carried by a radio frequency signal in a frequency band of a carrier wave and outputs the radio frequency signal; and
the RF signal combiner combines respective radio frequency signals in the frequency bands of the carrier wave outputted from the plurality of frequency converter and outputs the radio frequency signals.

5. The radio transmitting device according to claim 2,
wherein the multi-band RF signal generator includes at least
a plurality of low-pass filters removing a high frequency component of the plurality of input baseband signals;
a plurality of frequency converters making the plurality of input baseband signals outputted from the low-pass filters carried by respective radio frequency signals in frequency bands of the carrier wave and outputting the radio frequency signals;
a plurality of RF signal phase correctors correcting a phase of the radio frequency signal outputted from the frequency converter;
a plurality of RF signal gain correctors correcting a gain of the radio frequency signal outputted from the frequency converter; and
an RF signal combiner combining the radio frequency signals whose gains and phases are corrected in the RF signal gain corrector and the RF signal phase corrector and outputting the radio frequency signals;
wherein the distortion compensation control signal generating unit generates corrected baseband signals by applying distortion compensating functions to compensate a distortion characteristic of the power amplifier to the plurality of input baseband signals, and controls a gain correction amount in the RF signal gain corrector and a phase correction amount in the RF signal phase corrector so that a radio frequency signal in a frequency band of a carrier wave carrying the corrected baseband signals may be outputted from the multi-band RF signal generator.

6. The radio transmitting device according to claim 2,
wherein the multi-band RF signal generator includes at least
a plurality of low-pass filters removing a high frequency component of the plurality of input baseband signals;
a plurality of baseband signal phase correctors correcting each phase of the plurality of input baseband signals outputted from the low-pass filters;
a plurality of baseband signal gain correctors correcting each gain of the plurality of input baseband signals outputted from the low-pass filters;
a plurality of frequency converters making the plurality of input baseband signals outputted from the baseband signal phase corrector and the baseband signal gain corrector carried by respective radio frequency signals in frequency bands of the carrier wave and to outputting the radio frequency signals; and
an RF signal combiner combining the radio frequency signals outputted from the frequency converter and outputting the radio frequency signals;
wherein the distortion compensation control signal generating unit generates corrected baseband signals by applying distortion compensating functions to compensate a distortion characteristic of the power amplifier to the plurality of input baseband signals, and controls a gain correction amount in the baseband signal gain corrector and a phase correction amount in the baseband signal phase corrector so that a radio frequency signal in a frequency band of a carrier wave carrying the corrected baseband signals may be outputted from the multi-band RF signal generator.

7. The radio transmitting device according to claim 1,
wherein the transmitter delay correction unit makes input baseband signals carried by a single carrier wave branch into a plurality of parts corresponding to the number of the different frequencies, and adds a delay time to each of the divided input baseband signals; and
the delay time is a difference between a delay which input baseband signals carried by one carrier wave suffer in the multi-band RF signal generator and a delay which input baseband signals carried by the other carrier wave suffer in the multi-band RF signal generator.

8. The radio transmitting device according to claim 7,
wherein the multi-band RF signal generator includes a plurality of low-pass filters, a plurality of frequency converter, and a RF signal combiner at least,
wherein the low-pass filter removes a high frequency component of a baseband signal inputted from the distortion compensation control signal generating unit;
the frequency converter makes the baseband signal outputted from the low-pass filter carried by a radio frequency signal in a frequency band of a carrier wave and outputs the radio frequency signal; and
the RF signal combiner combines respective radio frequency signals in the frequency bands of the carrier wave outputted from the plurality of frequency converter and outputs the radio frequency signals.

9. The radio transmitting device according to claim 1,
wherein the multi-band RF signal generator includes a plurality of low-pass filters, a plurality of frequency converter, and a RF signal combiner at least,
wherein the low-pass filter removes a high frequency component of a baseband signal inputted from the distortion compensation control signal generating unit;
the frequency converter makes the baseband signal outputted from the low-pass filter carried by a radio frequency signal in a frequency band of a carrier wave and outputs the radio frequency signal; and
the RF signal combiner combines respective radio frequency signals in the frequency bands of the carrier wave outputted from the plurality of frequency converter and outputs the radio frequency signals.

10. The radio transmitting device according to claim 9,
wherein the multi-band RF signal generator further includes a delay detector detecting a delay time of the low-pass filter;
the delay detector sends the detected delay time of the low-pass filter to the transmitter delay correction unit; and
the transmitter delay correction unit corrects the delay time of the low-pass filter as a difference in delays which the plurality of input baseband signals receive respectively in the multi-band RF signal generator.

11. The radio transmitting device according to claim 1,
wherein the multi-band RF signal generator includes at least
a plurality of low-pass filters removing a high frequency component of the plurality of input baseband signals;
a plurality of frequency converters making the plurality of input baseband signals outputted from the low-pass filters carried by respective radio frequency signals in frequency bands of the carrier wave and outputting the radio frequency signals;
a plurality of RF signal phase correctors correcting a phase of the radio frequency signal outputted from the frequency converter;
a plurality of RF signal gain correctors correcting a gain of the radio frequency signal outputted from the frequency converter; and
an RF signal combiner combining the radio frequency signals whose gains and phases are corrected in the RF signal gain corrector and the RF signal phase corrector and outputting the radio frequency signals;
wherein the distortion compensation control signal generating unit generates corrected baseband signals by applying distortion compensating functions to compensate a distortion characteristic of the power amplifier to the plurality of input baseband signals, and controls a gain correction amount in the RF signal gain corrector and a phase correction amount in the RF signal phase corrector so that a radio frequency signal in a frequency band of a carrier wave carrying the corrected baseband signals may be outputted from the multi-band RF signal generator.

12. The radio transmitting device according to claim 11,
wherein the multi-band RF signal generator further includes a delay detector detecting a delay time of the low-pass filter;
the delay detector sends the detected delay time of the low-pass filter to the transmitter delay correction unit; and
the transmitter delay correction unit corrects the delay time of the low-pass filter as a difference in delays which the plurality of input baseband signals receive respectively in the multi-band RF signal generator.

13. The radio transmitting device according to claim 1,
wherein the multi-band RF signal generator includes at least
a plurality of low-pass filters removing a high frequency component of the plurality of input baseband signals;
a plurality of baseband signal phase correctors correcting each phase of the plurality of input baseband signals outputted from the low-pass filters;
a plurality of baseband signal gain correctors correcting each gain of the plurality of input baseband signals outputted from the low-pass filters;
a plurality of frequency converters making the plurality of input baseband signals outputted from the baseband signal phase corrector and the baseband signal gain corrector carried by respective radio frequency signals in frequency bands of the carrier wave and to outputting the radio frequency signals; and
an RF signal combiner combining the radio frequency signals outputted from the frequency converter and outputting the radio frequency signals;
wherein the distortion compensation control signal generating unit generates corrected baseband signals by applying distortion compensating functions to compensate a distortion characteristic of the power amplifier to the plurality of input baseband signals, and controls a gain correction amount in the baseband signal gain corrector and a phase correction amount in the baseband signal phase corrector so that a radio frequency signal in a frequency band of a carrier wave carrying the corrected baseband signals may be outputted from the multi-band RF signal generator.

14. The radio transmitting device according to claim 13,
wherein the multi-band RF signal generator further includes a delay detector detecting a delay time of the low-pass filter;
the delay detector sends the detected delay time of the low-pass filter to the transmitter delay correction unit; and
the transmitter delay correction unit corrects the delay time of the low-pass filter as a difference in delays which the plurality of input baseband signals receive respectively in the multi-band RF signal generator.

15. A radio transmitting method, comprising:
correcting a difference in delays which a plurality of input baseband signals receive respectively in generating a radio frequency signal obtained by making each of the plurality of input baseband signals carried by a carrier wave with each of different frequencies; and
applying a distortion compensating function for compensating a distortion characteristic in amplifying the radio frequency signal to the plurality of baseband signals with the difference in delays corrected.

16. The radio transmitting method according to claim 15, further comprising:
converting the amplified radio frequency signal into an output baseband signal with respect to each carrier frequency band;
calculating a correlation function between the input baseband signal and the output baseband signal;
calculating on the basis of the correlation function a whole path delay time of a delay time which the input baseband signal receives from when the distortion compensating function is applied till when the input baseband signal is converted into the output baseband signal;
correcting a difference in a delay time with respect to each of the plurality of input baseband signals on the basis of the whole path delay time; and
calculating the distortion compensation function for each frequency band of the carrier wave on the basis of the input baseband signal given a correction of the difference in the delay time and the output baseband signal.

17. The radio transmitting method according to claim 16,
wherein in correcting the difference in the delay time,
input baseband signals carried by a single carrier wave are made to branch into a plurality of parts corresponding to the number of the different frequencies,
a delay time is added to each of the divided input baseband signals; and
the delay time is a difference between a delay which input baseband signals carried by one carrier wave suffer in the amplifying and a delay which input baseband signals carried by the other carrier wave suffer in the amplifying.

18. The radio transmitting method according to claim 15,
wherein in correcting the difference in the delay time,
input baseband signals carried by a single carrier wave are made to branch into a plurality of parts corresponding to the number of the different frequencies,
a delay time is added to each of the divided input baseband signals; and
the delay time is a difference between a delay which input baseband signals carried by one carrier wave suffer in the amplifying and a delay which input baseband signals carried by the other carrier wave suffer in the amplifying.

19. A radio transmitting device, comprising:
a multi-band RF signal generating means for making each of a plurality of input baseband signals carried by a carrier wave with each of different frequencies, and outputting the carrier wave as a radio frequency signal;
a power amplifying means for amplifying and outputting the radio frequency signal;
a distortion compensation control signal generating means for applying a distortion compensating function, which compensates a distortion characteristic of the power amplifying means, to the each of the plurality of input baseband signals; and
a transmitter delay correction means for correcting a difference in delays which the plurality of input baseband signals receive respectively in the multi-band RF signal generating means.

* * * * *